US012111601B2

(12) United States Patent
Wada et al.

(10) Patent No.: US 12,111,601 B2
(45) Date of Patent: *Oct. 8, 2024

(54) IMAGE FORMING APPARATUS HAVING AN OPENING/CLOSING MEMBER THAT IS PREVENTED FROM CLOSING WHEN A REPLENISHMENT CONTAINER IS ATTACHED TO A PROCESS UNIT

(71) Applicant: CANON KABUSHIKI KAISHA, Tokyo (JP)

(72) Inventors: Koji Wada, Kanagawa (JP); Tsuyoshi Ogawa, Tokyo (JP); Hiroshi Takarada, Kanagawa (JP); Kenji Matsuzaka, Kanagawa (JP); Takao Sameshima, Kanagawa (JP); Tomio Noguchi, Shizuoka (JP); Yuichiro Inaba, Kanagawa (JP); Kenichi Iida, Tokyo (JP); Masaaki Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/092,996

(22) Filed: Jan. 4, 2023

(65) Prior Publication Data

US 2023/0134527 A1 May 4, 2023

Related U.S. Application Data

(63) Continuation of application No. 17/472,964, filed on Sep. 13, 2021, now Pat. No. 11,573,521, which is a (Continued)

(30) Foreign Application Priority Data

Mar. 15, 2019 (JP) ................................ 2019-049217
Mar. 11, 2020 (JP) ................................ 2020-042020

(51) Int. Cl.
*G03G 21/16* (2006.01)

(52) U.S. Cl.
CPC ................................ *G03G 21/1619* (2013.01)

(58) Field of Classification Search
CPC ........... G03G 21/1619; G03G 15/0865; G03G 15/0867
See application file for complete search history.

(56) References Cited

U.S. PATENT DOCUMENTS 6,212,338 B1 4/2001 Hagihara et al.
6,229,975 B1 5/2001 Wihelm et al.

(Continued)

FOREIGN PATENT DOCUMENTS

EP 3765909 B1 7/2023
EP 3781991 B1 9/2023

(Continued)

OTHER PUBLICATIONS

PCT International Search Report mailed Apr. 21, 2020, in PCT/JP2020/011083.

(Continued)

*Primary Examiner* — Sandra Brase
(74) *Attorney, Agent, or Firm* — VENABLE LLP

(57) ABSTRACT

An image forming apparatus includes a developer container to and from which a replenishment container is attachable and detachable, the developer container including an accommodating portion, and a supporting portion, wherein the developer container includes a projection portion that is provided at one end portion thereof in the rotation axis direction of the developer bearing member and projects toward the supporting portion more than a center portion of the developer container in a crossing direction crossing the rotation axis direction, the projection portion communicates with the accommodating portion and includes, at a distal end (Continued)

portion thereof, an attachment portion configured such that the replenishment container is attachable thereto in a state of being exposed to the outside of the apparatus, and a replenishment port for replenishing the accommodating portion with developer from the replenishment container is defined in the attachment portion.

12 Claims, 30 Drawing Sheets

Related U.S. Application Data continuation of application No. PCT/JP2020/011083, filed on Mar. 13, 2020.

(56) References Cited

U.S. PATENT DOCUMENTS

| | | | | |
|---|---|---|---|---|
| 6,269,234 | B1 | 7/2001 | Kurz et al. | |
| 9,216,583 | B2 | 12/2015 | Aoki et al. | |
| 11,573,521 | B2 * | 2/2023 | Wada | G03G 21/1619 |
| 2016/0342133 | A1 | 11/2016 | Hiramatsu et al. | |
| 2019/0121257 | A1 | 4/2019 | Yang et al. | |
| 2021/0109460 | A1 | 4/2021 | Kubo et al. | |
| 2021/0247706 | A1 | 8/2021 | Mitsumata et al. | |
| 2021/0405552 | A1 | 12/2021 | Sato et al. | |
| 2021/0405555 | A1 | 12/2021 | Ogawa et al. | |
| 2021/0405577 | A1 | 12/2021 | Noguchi et al. | |
| 2022/0075291 | A1 | 3/2022 | Kubo et al. | |

FOREIGN PATENT DOCUMENTS

| | | | |
|---|---|---|---|
| JP | H06-222667 | A | 8/1994 |
| JP | H08-30084 | A | 2/1996 |
| JP | H09-006111 | A | 1/1997 |
| JP | H09-258542 | A | 10/1997 |
| JP | 2003-084549 | A | 3/2003 |
| JP | 2003-084556 | A | 3/2003 |
| JP | 2017-054106 | A | 3/2017 |
| JP | 6269234 | B2 | 1/2018 |
| WO | 2020/046420 | A1 | 3/2020 |

OTHER PUBLICATIONS

European Search Report dated Nov. 14, 2022, in related European Patent Application No. 20774371.7.

European Office Action dated Apr. 30, 2024, in related European Patent Application No. 20774371.7.

Japanese Office Action dated Feb. 20, 2024, in related Japanese Patent Application No. 2020-042020.

* cited by examiner

Low

Mid

Full

IMAGE FORMING APPARATUS HAVING AN OPENING/CLOSING MEMBER THAT IS PREVENTED FROM CLOSING WHEN A REPLENISHMENT CONTAINER IS ATTACHED TO A PROCESS UNIT

CROSS-REFERENCE TO RELATED APPLICATIONS

This application is a continuation of application Ser. No. 17/472,964, filed Sep. 13, 2021, which is a continuation of PCT Application No. PCT/JP2020/011083, filed Mar. 13, 2020.

BACKGROUND OF THE INVENTION

Field of the Invention

The present invention relates to an image forming apparatus that forms an image on a recording material.

Description of the Related Art

Typically, an image forming apparatus of an electrophotographic system forms an image by transferring a toner image formed on the surface of a photosensitive drum onto a transfer material serving as a transfer medium. In addition, as a replenishment system of developer, for example, a process cartridge system and a toner replenishment system are known. The process cartridge system is a system in which a photosensitive drum and a developer container are integrated as a process cartridge and the process cartridge is replaced by a new one when the developer is run out.

In contrast, the toner replenishment system is a system in which the developer container is replenished with new toner when the toner runs out. According to Japanese Patent Application Laid-Open No. H08-30084, a one-component developing apparatus of a toner replenishment system in which a toner supply box capable of replenishing toner is connected to a toner conveyance path in which toner is conveyed is proposed. Toner reserved in the toner supply box is conveyed to the toner conveyance path by a conveyance screw.

In recent years, for an image forming apparatus, users have desired various systems such as the process cartridge system and the toner replenishment system described above.

SUMMARY OF THE INVENTION

According to one aspect of the present invention, an image forming apparatus to and from which a replenishment container accommodating developer is attachable and detachable and which is configured to form a developer image on a recording material, the image forming apparatus includes an image bearing member configured to rotate while bearing the developer image, a developer bearing member configured to bear the developer and supply the developer to the image bearing member, a developer container to and from which the replenishment container is attachable and detachable, the developer container being configured to rotatably support the developer bearing member and including an accommodating portion configured to accommodate the developer to be borne on the developer bearing member, a transfer portion configured to transfer the developer image on the image bearing member onto a recording material, and a supporting portion configured to support the recording material onto which the developer image has been transferred and which has been discharged to an outside of the image forming apparatus, wherein the developer container includes a projection portion provided at one end portion thereof in a rotation axis direction of the image bearing member, the projection portion projecting toward the supporting portion more than a center portion of the developer container in a crossing direction crossing the rotation axis direction, wherein the projection portion communicates with the accommodating portion and includes, at a distal end portion thereof, an attachment portion which is configured such that the replenishment container is attachable thereto, the attachment portion being provided with a replenishment port for replenishing the accommodating portion with the developer from the replenishment container, wherein the image forming apparatus comprises an opening/closing member movable between a closed position where the opening/closing member is closed to cover the attachment portion and an open position where the opening/closing member is open to open the attachment portion and where attachment of the attachment portion to the replenishment container is allowed, and wherein the opening/closing member is configured such that a movement thereof from the open position to the closed position is hindered by the replenishment container attached to the attachment portion.

Further features of the present invention will become apparent from the following description of exemplary embodiments with reference to the attached drawings.

DESCRIPTION OF THE EMBODIMENTS

Exemplary embodiments of the present invention will be described below with reference to drawings.

First Embodiment

Figure 1A:
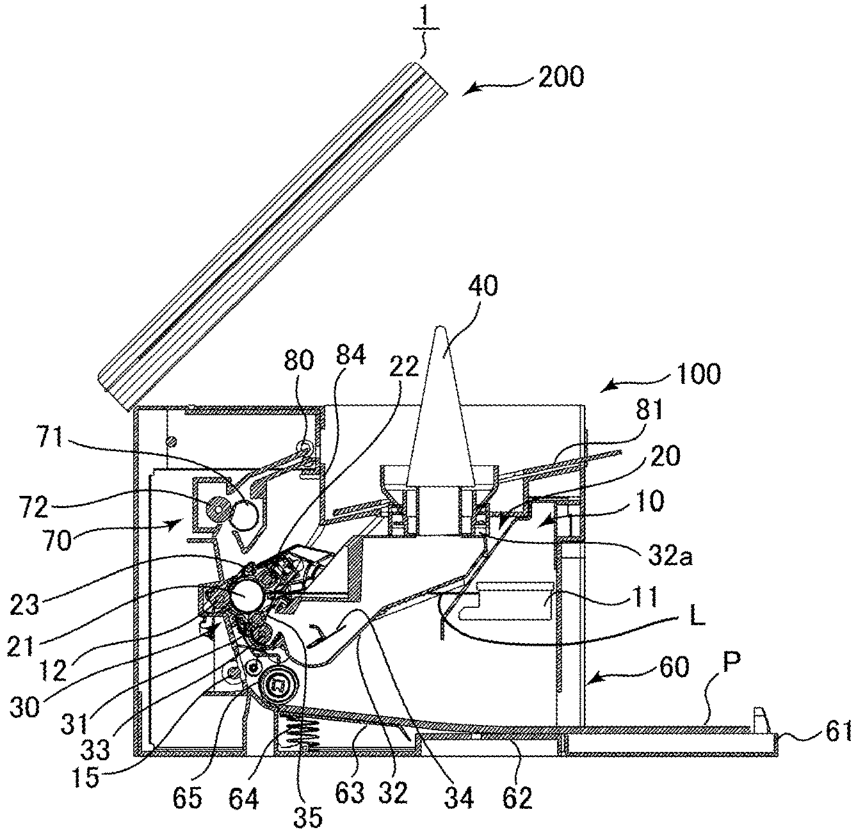
FIG. 1A is a section view of an image forming apparatus according to a first embodiment.

FIG. 1A is a schematic diagram illustrating a configuration of an image forming apparatus 1 according to a first embodiment. The image forming apparatus 1 is a monochromatic printer that forms an image on a recording material on the basis of image information input from an external device. Examples of the recording material include various sheet materials of different materials like paper sheets such as plain paper sheets and cardboards, plastic films such as sheets for overhead projectors, sheets of irregular shapes such as envelopes and index paper sheets, and cloths.

Overall Configuration

Figure 1B:
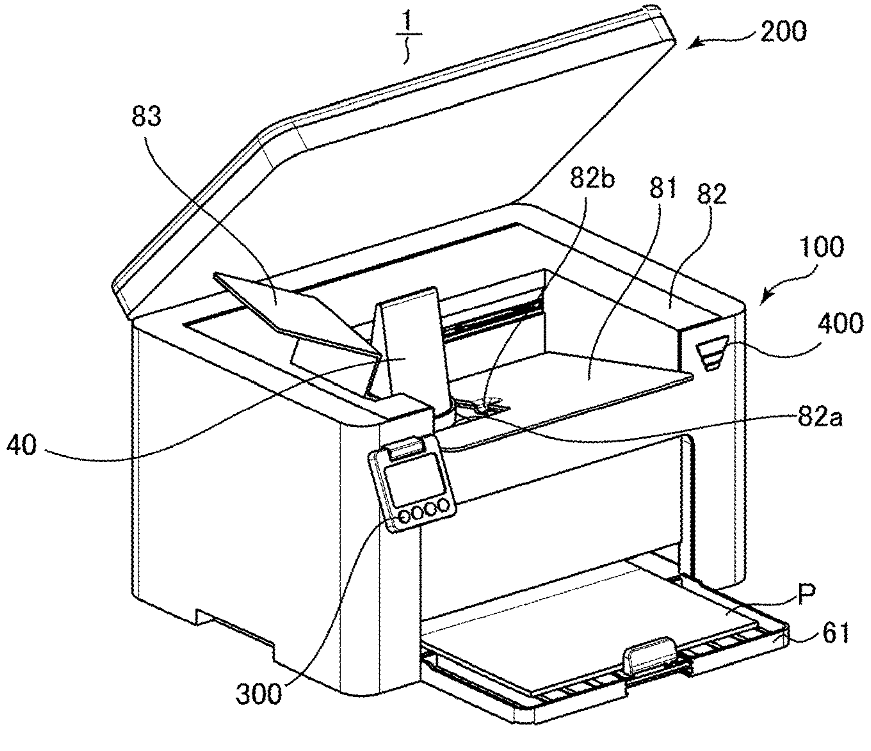
FIG. 1B is a perspective view of the image forming apparatus.

As illustrated in FIGS. 1A and 1B, the image forming apparatus 1 includes a printer body 100 serving as an apparatus body, a reading apparatus 200 openably and closably supported by the printer body 100, and an operation portion 300 attached to an exterior surface of the printer body 100. The printer body 100 includes an image forming portion 10 that forms a toner image on a recording material, a feeding portion 60 that feeds the recording material to the image forming portion 10, a fixing portion 70 that fixes the toner image formed by the image forming portion 10 to the recording material, and a discharge roller pair 80.

Figure 6A:
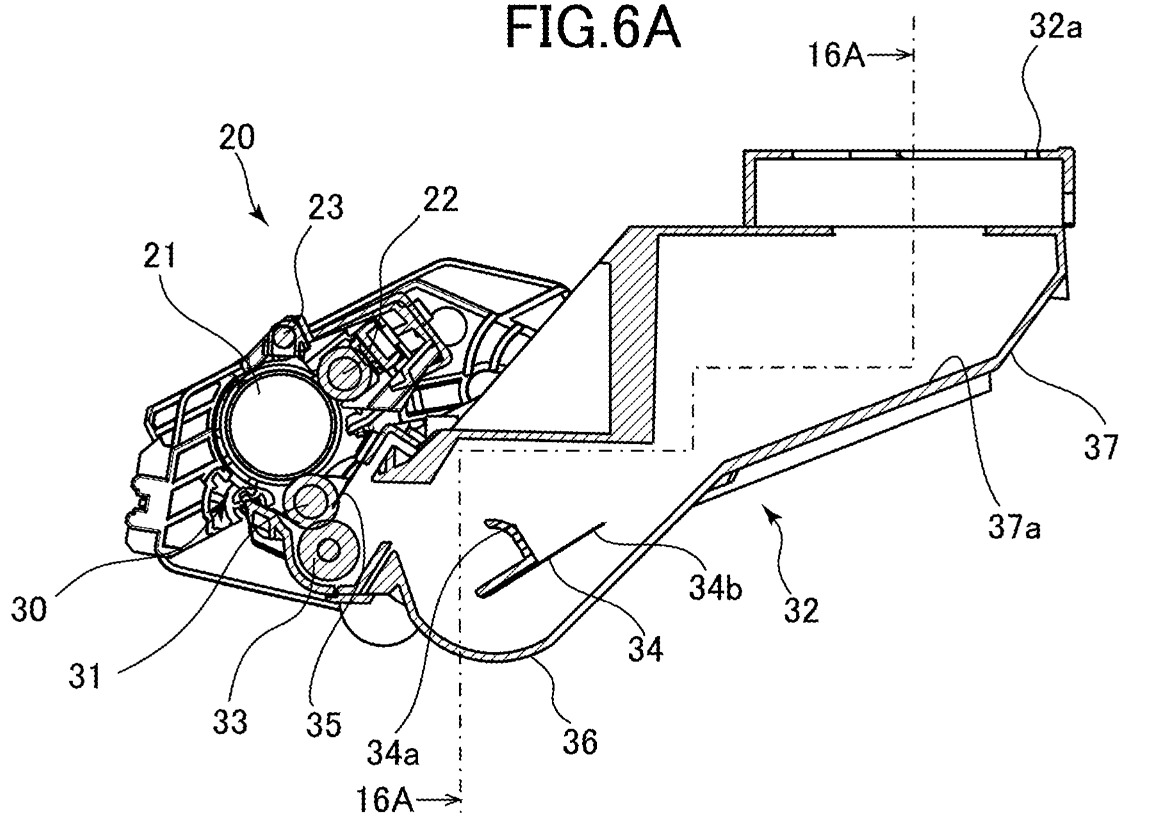
FIG. 6A is a section view taken along 6A-6A of FIG. 5B.
Figure 6B:
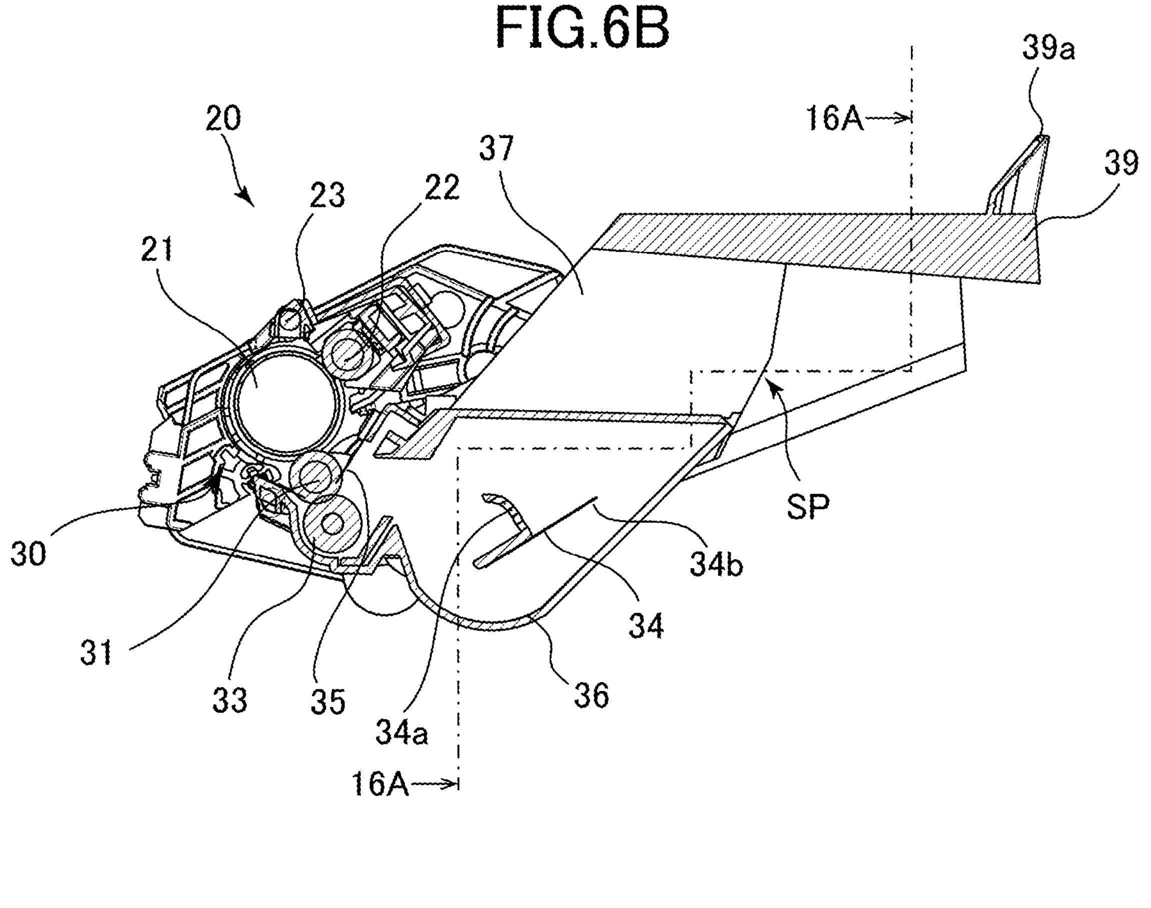
FIG. 6B is a section view taken along 6B-6B of FIG. 5B.

The image forming portion 10 includes a scanner unit 11, a process cartridge 20 of an electrophotographic system, and a transfer roller 12 that transfers a toner image serving as a developer image formed on a photosensitive drum 21 of the process cartridge 20 onto the recording material. As illustrated in FIGS. 6A and 6B, the process cartridge 20 includes the photosensitive drum 21, a charging roller 22 disposed in the vicinity of the photosensitive drum 21, and a developing apparatus 30 including a pre-exposing apparatus 23 and a developing roller 31.

The photosensitive drum 21 is a photoconductor formed in a cylindrical shape. The photosensitive drum 21 of the present embodiment includes a drum-shaped base body formed from aluminum, and a photosensitive layer formed from a negatively-chargeable organic photoconductor thereon. In addition, the photosensitive drum 21 serving as an image bearing member is rotationally driven by a motor in a predetermined direction (clockwise direction in the figure) at a predetermined process speed.

The charging roller 22 comes into contact with the photosensitive drum 21 at a predetermined pressure contact force to form a charging portion. In addition, a desired charging voltage is applied thereto by a charging high-voltage power source, and thus the surface of the photosensitive drum 21 is uniformly charged to a predetermined potential. In the present embodiment, the photosensitive drum 21 is charged to a negative polarity by the charging roller 22. The pre-exposing apparatus 23 de-electrifies the surface potential of the photosensitive drum 21 before entering the charging portion so as to cause stable electrical discharge in the charging portion.

The scanner unit 11 serving as an exposing portion exposes the surface of the photosensitive drum 21 in a scanning manner by radiating laser light corresponding to the image information input from the external device or the reading apparatus 200 onto the photosensitive drum 21 by using a polygon mirror. As a result of this exposure, an electrostatic latent image corresponding to the image information is formed on the surface of the photosensitive drum 21. To be noted, the scanner unit 11 is not limited to a laser scanner apparatus, and for example, an LED exposing apparatus including an LED array in which a plurality of LEDs are arranged in the longitudinal direction of the photosensitive drum 21 may be employed.

The developing apparatus 30 includes a developing roller 31 serving as a developer bearing member that bears developer, a developer container 32 serving as a frame member of the developing apparatus 30, and a supply roller 33 that supplies developer to the developing roller 31. The developing roller 31 and the supply roller 33 are rotatably supported by the developer container 32. In addition, the developing roller 31 is disposed at an opening portion of the developer container 32 so as to oppose the photosensitive drum 21. The supply roller 33 is rotatably in contact with the developing roller 31, and toner serving as developer accommodated in the developer container 32 is applied on the surface of the developing roller 31 by the supply roller 33. To be noted, the supply roller 33 is not necessary if a configuration in which enough toner can be supplied to the developing roller 31 is employed.

For the developing apparatus 30 of the present embodiment, a contact developing system is used as the development system. That is, a toner layer borne on the developing roller 31 comes into contact with the photosensitive drum 21 in a developing portion (developing region) where the photosensitive drum 21 and the developing roller 31 oppose each other. A developing voltage is applied to the developing roller 31 by a developing high-voltage power source. Under the developing voltage, toner borne on the developing roller 31 transfers from the developing roller 31 onto the drum surface in accordance with the potential distribution of the surface of the photosensitive drum 21, and thus the electrostatic latent image is developed as a toner image. To be noted, in the present embodiment, a reverse development system is employed. That is, toner attaches to a surface region of the photosensitive drum 21, which is charged in a charging step, exposed in an exposing step, and thus has a reduced charge amount, and thus a toner image is formed.

In addition, in the present embodiment, toner having a particle diameter of 6 μm and a normal charging polarity of a negative polarity is used. For example, as the toner of the present embodiment, polymer toner produced by a polymerization method is employed. In addition, the toner of the present embodiment is so-called nonmagnetic one-component developer that does not contain a magnetic component, and is borne on the developing roller 31 mainly by intermolecular force or electrostatic force (image force). However, one-component developer containing a magnetic component may be used. In addition, in some cases, the one-component developer contains additives (for example, wax and silica fine particles) for adjusting the fluidity and charging performance of toner in addition to toner particles. In addition, two-component developer constituted by nonmagnetic toner and magnetic carrier may be used as the developer. In the case of using magnetic developer, for example, a cylindrical developing sleeve on the inner circumferential surface of which a magnet is disposed is used as the developer bearing member.

An agitation member 34 serving as an agitation portion is provided inside the developer container 32. The agitation member 34 is driven to pivot by a motor M1 (see FIG. 12), thus agitates the toner in the developer container 32, and delivers (conveys) the toner to the developing roller 31 and the supply roller 33. In addition, the agitation member 34 has a function of circulating toner not used for development and peeled off from the developing roller 31 in the developer container to uniformize toner in the developer container. To be noted, the agitation member 34 is not limited to a pivoting type. For example, an agitation member of a swinging type may be employed. In addition, another agitation member may be further provided in addition to the agitation member 34.

In addition, a developing blade 35 that regulates the amount of toner borne on the developing roller 31 is disposed at the opening portion of the developer container 32 where the developing roller 31 is disposed. The toner supplied to the surface of the developing roller 31 passes through the opposing portion between the developing roller 31 and the developing blade 35 in accordance with the rotation of the developing roller 31, thus forms a uniform thin layer, and is negatively charged by frictional electrification.

As illustrated in FIGS. 1A and 1B, the feeding portion 60 includes a front door 61 openably and closably supported by the printer body 100, a tray portion 62, an inner plate 63, a tray spring 64, and a pickup roller 65. The tray portion 62 constitutes a bottom surface of a recording material accommodation space that is exposed by opening the front door 61, and the inner plate 63 is supported by the tray portion 62 so as to be capable of ascending and descending. The tray spring 64 urges the inner plate 63 upward, and presses a recording material P supported by the inner plate 63 against the pickup roller 65. To be noted, the front door 61 closes the recording material accommodation space in the state of being closed with respect to the printer body 100, and supports the recording material P together with the tray portion 62 and the inner plate 63 in the state of being open with respect to the printer body 100.

The fixing portion 70 is of a thermal fixation system that performs an image fixing process by heating and melting toner on a recording material. The fixing portion 70 includes a fixing film 71, a fixing heater such as a ceramic heater that heats the fixing film 71, a thermistor that measures the temperature of the fixing heater, and a pressurizing roller 72 that is in pressure contact with the fixing film 71.

Next, an image forming operation of the image forming apparatus 1 will be described. When a command of image formation is input to the image forming apparatus 1, an image forming process by the image forming portion 10 is started on the basis of image information input from an external computer connected to the image forming apparatus 1 or from the reading apparatus 200. The scanner unit 11 radiates laser light toward the photosensitive drum 21 on the basis of the input image information. At this time, the photosensitive drum 21 has been already charged by the charging roller 22, and an electrostatic latent image is formed on the photosensitive drum 21 as a result of the laser light irradiation. Then, this electrostatic latent image is developed by the developing roller 31, and thus a toner image is formed on the photosensitive drum 21.

In parallel with the image forming process described above, the pickup roller 65 of the feeding portion 60 delivers out the recording material P supported by the front door 61, the tray portion 62, and the inner plate 63. The recording material P is fed to a registration roller pair 15 by the pickup roller 65, and the skew thereof is corrected by abutting a nip of the registration roller pair 15. Then, the registration roller pair 15 is driven to match a transfer timing of the toner image, and conveys the recording material P to a transfer nip formed by the transfer roller 12 and the photosensitive drum 21.

A transfer voltage is applied to the transfer roller 12 serving as a transfer portion from a transfer high-voltage power source, and the toner image borne on the photosensitive drum 21 is transferred onto the recording material P conveyed by the registration roller pair 15. The recording material P onto which the toner image has been transferred is conveyed to the fixing portion 70, and the toner image is heated and pressurized when passing through a nip portion between the fixing film 71 and the pressurizing roller 72 of the fixing portion 70. As a result of this, toner particles melt and then adhere, and thus the toner image is fixed to the recording material P. The recording material P having passed through the fixing portion 70 is discharged to the outside of the image forming apparatus 1 (outside of the apparatus) by the discharge roller pair 80 serving as a discharge portion, and is supported on a discharge tray 81 serving as a supporting portion formed in an upper portion of the printer body 100.

The discharge tray 81 is inclined upward toward the downstream side in a discharge direction of the recording material, the recording material discharged onto the discharge tray 81 slides down the discharge tray 81, and thus the trailing end thereof is aligned by a regulating surface 84.

Figure 4A:
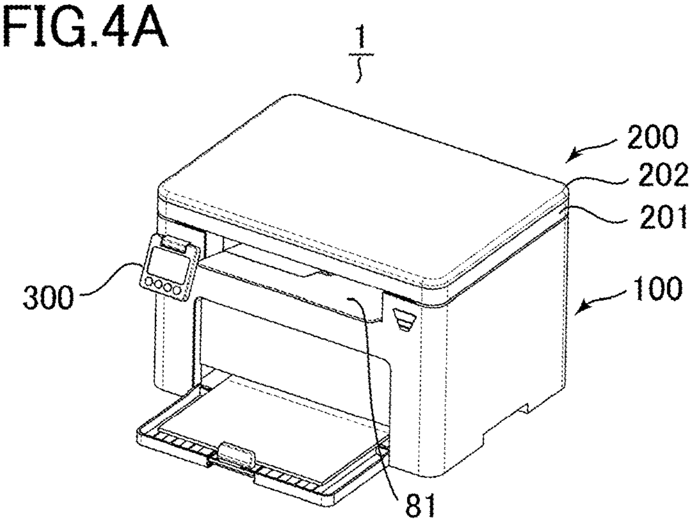
FIG. 4A is a perspective view of the image forming apparatus in a state in which a pressure plate of a reading apparatus is closed.
Figure 4B:
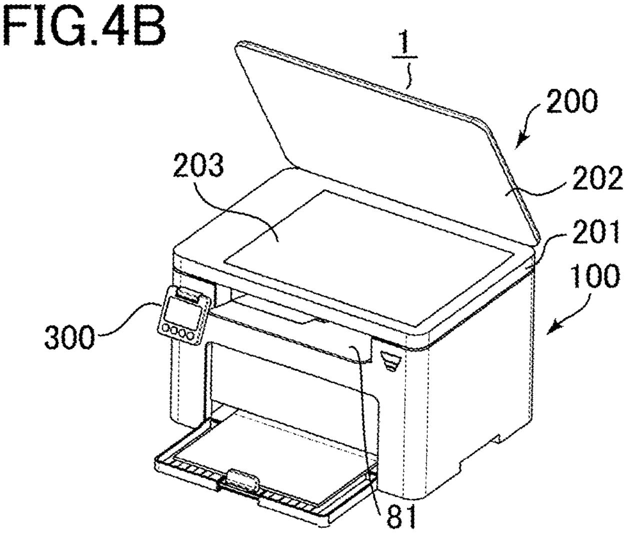
FIG. 4B is a perspective view of the image forming apparatus in a state in which the pressure plate is open.

As illustrated in FIGS. 4A and 4B, the reading apparatus 200 includes a reading unit 201 including an unillustrated reading portion therein, and a pressure plate 202 openably and closably supported by the reading unit 201. A platen glass 203 which transmits light emitted from the reading portion and on which a document is to be placed is provided on the upper surface of the reading unit 201.

In the case where an image of a document is to be read by the reading apparatus 200, a user places the document on the platen glass 203 in a state in which the pressure plate 202 is open. Then, the pressure plate 202 is closed to prevent displacement of the document on the platen glass 203, and for example, the operation portion 300 is operated to output a reading command to the image forming apparatus 1. When a reading operation is started, the reading portion in the reading unit 201 reciprocates in a sub-scanning direction, that is, a left-right direction as viewed from the front of the operation portion 300 of the image forming apparatus 1. The reading portion receives light reflected on the document by a light receiving portion while emitting light to the document from a light emitting portion, and performs photoelectric conversion to read the image of the document. To be noted, a front-rear direction, a left-right direction, and an up-down direction are defined on the basis of a state as viewed from the front of the operation portion 300.

Figure 2A:
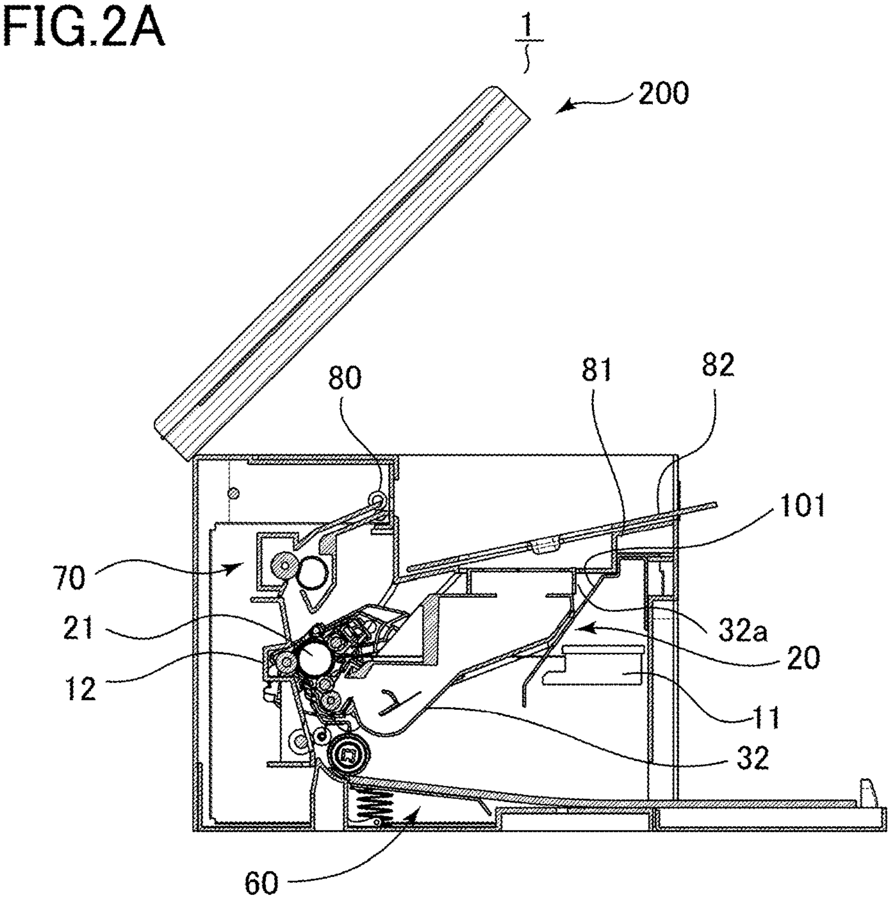
FIG. 2A is a section view of the image forming apparatus.
Figure 2B:
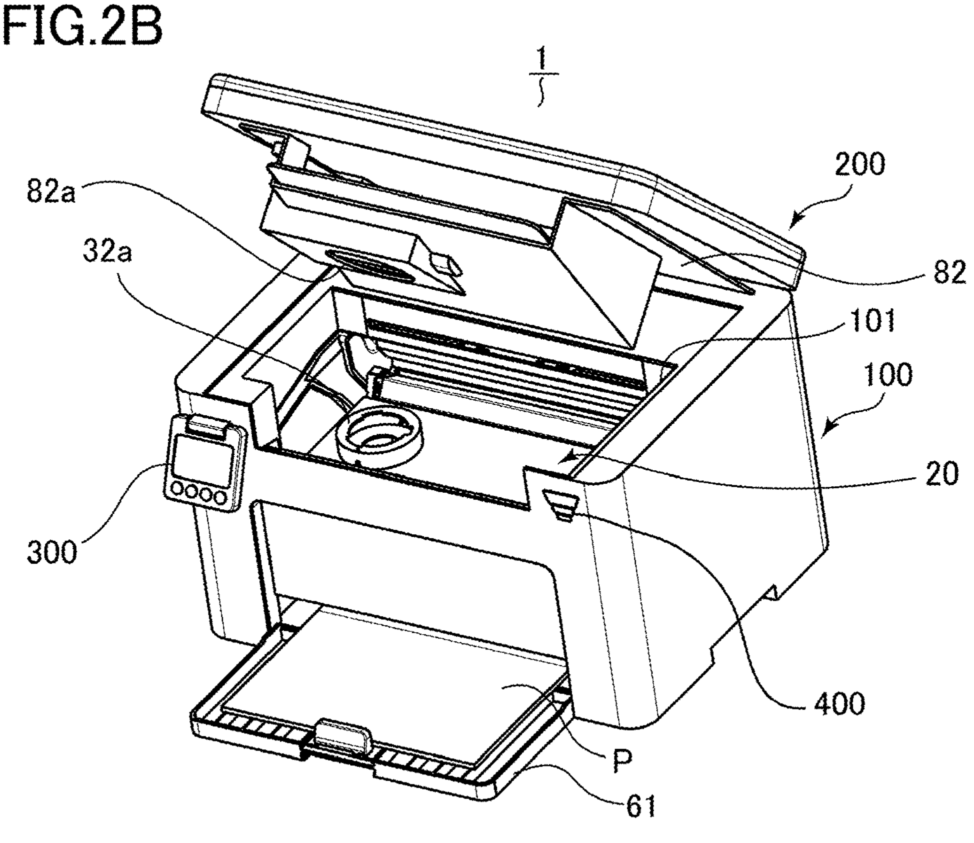
FIG. 2B is a perspective view of the image forming apparatus in a state in which a top cover is open.
Figure 3:
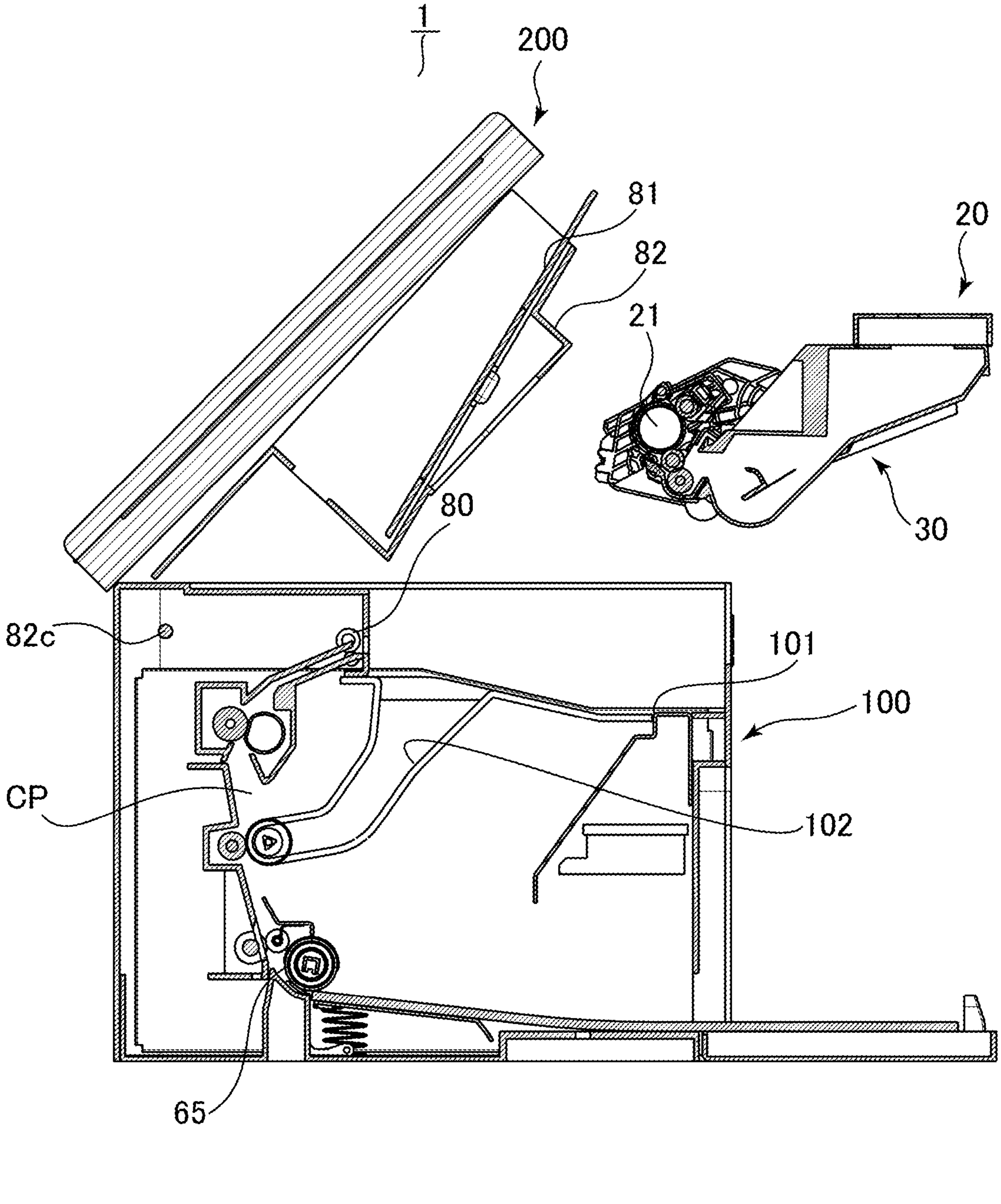
FIG. 3 is a section view of the image forming apparatus in a state in which a process cartridge is detached.

As illustrated in FIGS. 2B and 3, a first opening portion 101 opening upward is defined in an upper portion of the printer body 100, and the first opening portion 101 is covered by a top cover 82. The top cover 82 serving as a supporting tray is supported so as to be openable and closable about a pivot shaft 82*c* extending in the left-right direction with respect to the printer body 100, and the discharge tray 81 serving as a supporting surface is formed on the upper surface thereof. The top cover 82 is opened from the front side to the rear side in a state in which the reading apparatus 200 is open with respect to the printer body 100. To be noted, the reading apparatus 200 and the top cover 82 may be configured to be held in an open state and a closed state by a holding mechanism such as a hinge mechanism.

For example, in the case where a jam of the recording material occurs due to paper jam or the like in a conveyance path CP which the recording material fed by the pickup roller 65 passes through, the user opens the top cover 82 together with the reading apparatus 200. Then, the user accesses the process cartridge 20 through the first opening portion 101 exposed by opening the top cover 82, and draws out the process cartridge 20 along cartridge guides 102. The cartridge guides 102 slide on and guide projection portions 21*a* (see FIG. 5A) provided at end portions of the photosensitive drum 21 of the process cartridge 20 in the axial direction.

Then, as a result of drawing out the process cartridge 20 to the outside through the first opening portion 101, a space through which a hand can access the conveyance path CP is generated. The user can put their hand in the printer body 100 through the first opening portion 101, and thus can access the recording material jamming the conveyance path CP to remove the jammed recording material.

Figure 4C:
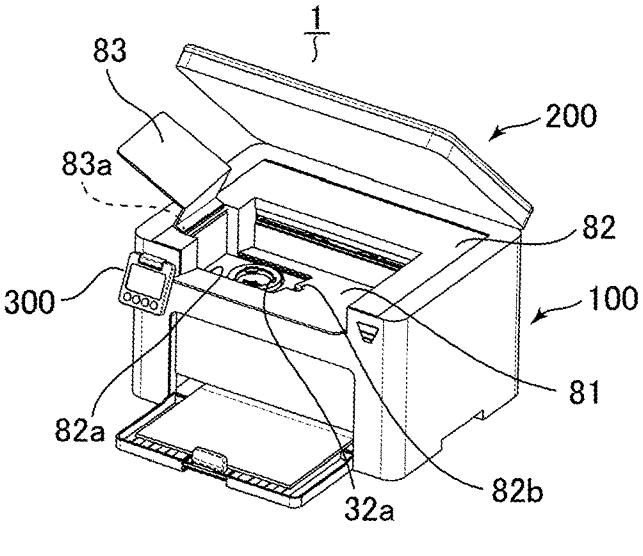
FIG. 4C is a perspective view of the image forming apparatus in a state in which the reading apparatus is open.

In addition, in the present embodiment, as illustrated in FIGS. 1B and 4C, an opening/closing member 83 is openably and closably provided on the top cover 82. A second opening portion 82*a* serving as an opening portion opening upward is defined in the discharge tray 81 of the top cover 82. The opening/closing member 83 is configured to be movable between a closed position where the opening/closing member 83 covers the replenishment port 32*a* such that the toner pack 40 cannot be attached to the developer container 32, and an open position where the opening/closing member 83 exposes the replenishment port 32*a* such that the toner pack 40 can be attached to the developer container 32. The opening/closing member 83 functions as a part of the discharge tray 81 in the closed position. The opening/closing member 83 and the second opening portion 82*a* are formed on the left side of the discharge tray 81. In addition, the opening/closing member 83 is supported by the top cover 82 so as to be openable and closable about a pivot shaft 83*a* extending in the front-rear direction, and is opened to the left by hooking a finger thereon through a groove portion 82*b* provided on the top cover 82. The opening/closing member 83 is formed in an approximate L shape in accordance with the shape of the top cover 82. The opening/closing member 83 is configured such that a movement thereof from the open position to the closed position is hindered by the toner pack 40 attached to an attachment portion 57 described later.

The second opening portion 82*a* of the discharge tray 81 is open such that the replenishment port 32*a* for toner replenishment defined in an upper portion of the developer container 32 is exposed, and the user can access the replenishment port 32*a* by opening the opening/closing member 83 without opening the top cover 82. To be noted, in the present embodiment, a system (direct replenishment system) in which the user replenishes the developing apparatus 30 with toner from the toner pack 40 (see FIGS. 1A and 1B) filled with toner for replenishment in a state in which the developing apparatus 30 is still attached to the image forming apparatus 1 is employed. Therefore, in the case where the toner remainder amount of the process cartridge 20 is small, an operation of taking out the process cartridge 20 from the printer body 100 and replacing the process cartridge 20 with a brand-new process cartridge is no longer necessary, and thus the usability can be improved. In addition, the developer container 32 can be replenished with toner at lower cost than replacing the whole process cartridge 20. To be noted, the direct replenishment system can reduce the cost also as compared with the case where only the developing apparatus 30 of the process cartridge 20 is replaced because there is no need to replace various rollers and gears. To be noted, the image forming apparatus 1 and the toner pack 40 constitute an image forming system.

Collection of Transfer Residual Toner

In the present embodiment, a cleanerless configuration in which transfer residual toner remaining on the photosensitive drum 21 without being transferred onto the recording material P is collected into the developing apparatus 30 and reused is employed. The transfer residual toner is removed by the following process. The transfer residual toner includes, in mixture, toner charged to a positive polarity and toner that is charged to a negative polarity but does not have enough charges. The photosensitive drum 21 after transfer is de-electrified by the pre-exposing apparatus 23, the charging roller 22 is caused to generate uniform electrical discharge, and thus the transfer residual toner is charged to a negative polarity again. The transfer residual toner charged to a negative polarity again in the charging portion reaches the developing portion in accordance with the rotation of the photosensitive drum 21. Then, the surface region of the photosensitive drum 21 having passed the charging portion is exposed by the scanner unit 11 in a state in which the transfer residual toner is still attached to the surface thereof, and thus an electrostatic latent image is drawn thereon.

Here, the behavior of the transfer residual toner having reached the developing portion will be described separately for an exposed portion and a non-exposed portion of the photosensitive drum 21. In the developing portion, the transfer residual toner attached to the non-exposed portion of the photosensitive drum 21 is transferred onto the developing roller 31 due to a potential difference between the potential (dark potential) of the non-exposed portion of the photosensitive drum 21 and the developing voltage, and is collected into the developer container 32. This is because the developing voltage applied to the developing roller 31 is relatively positively polarized with respect to the potential of the non-exposed portion on the premise that the normal charging polarity of the toner is a negative polarity. To be noted, the toner collected into the developer container 32 is dispersed by being agitated by the agitation member 34 with toner in the developer container, and is borne on the developing roller 31 to be used in a developing process again.

In contrast, transfer residual toner attached to the exposed portion of the photosensitive drum 21 remains on the drum surface without being transferred from the photosensitive drum 21 to the developing roller 31 in the developing portion. This is because the potential of the developing voltage applied to the developing roller 31 is further on the negative polarity side than the potential (light potential) of the exposed portion on the premise that the normal charging polarity of toner is a negative polarity. The transfer residual toner remaining on the drum surface moves to the transfer portion while being borne on the photosensitive drum 21 together with other toner to be transferred from the developing roller 31 to the exposed portion, and is transferred onto the recording material P in the transfer portion.

Although a cleanerless configuration in which transfer residual toner is collected into the developing apparatus 30 and reused is employed in the present embodiment as described above, a conventionally known configuration in which transfer residual toner is collected by a cleaning blade that abuts the photosensitive drum 21 may be employed. In this case, the transfer residual toner collected by the cleaning blade is collected into a collection container provided separately from the developing apparatus 30. However, employing the cleanerless configuration eliminates the necessity to install a collection container for collecting transfer residual toner and the like and thus enables further miniaturization of the image forming apparatus 1, and reuse of transfer residual toner can reduce the printing cost.

Configuration of Developer Container and Toner Pack

Figure 5A:
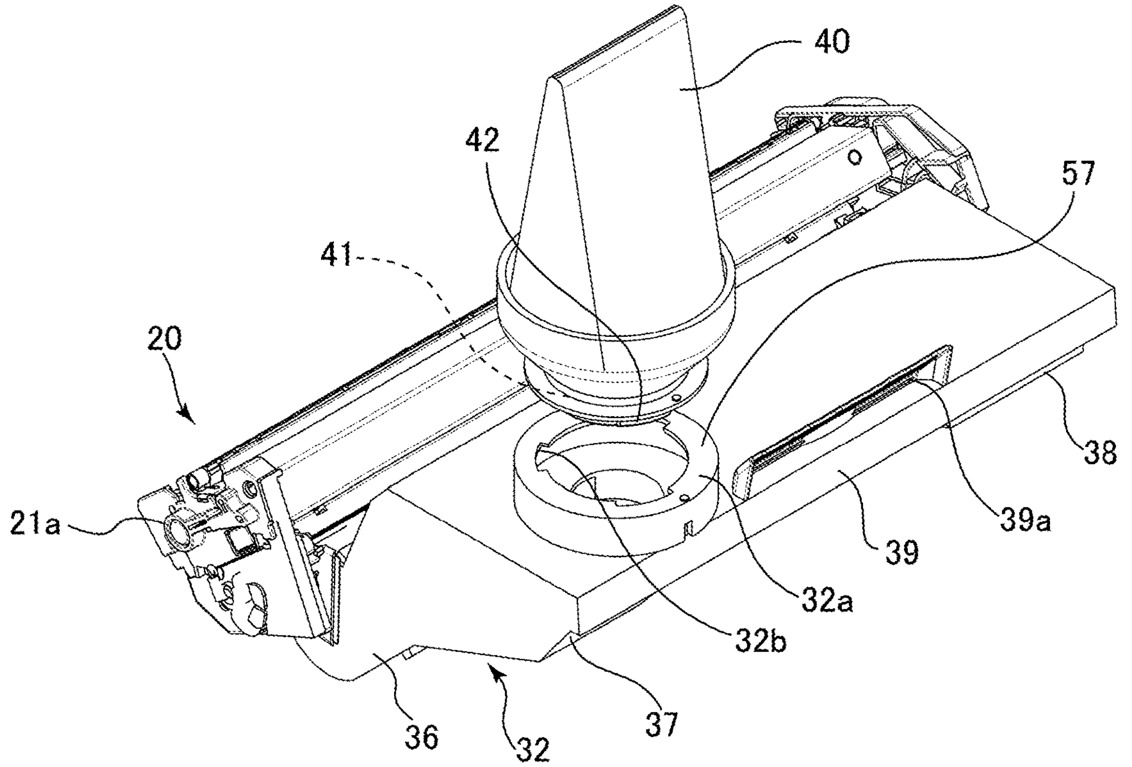
FIG. 5A is a perspective view of a developer container and a toner pack.
Figure 5B:
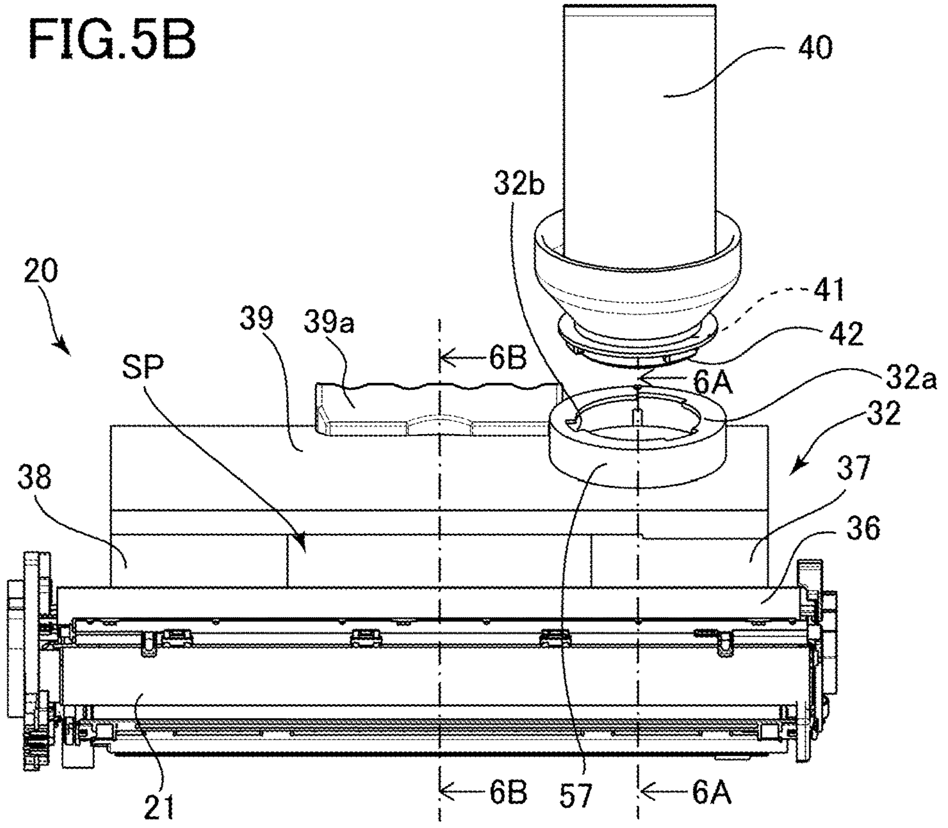
FIG. 5B is a front view of the developer container and the toner pack.

Next, the configuration of the developer container 32 and the toner pack 40 will be described. FIG. 5A is a perspective view of the developer container 32 and the toner pack 40, and FIG. 5B is a front view of the developer container 32 and the toner pack 40. FIG. 6A is a section view taken along 6A-6A of FIG. 5B, and FIG. 6B is a section view taken along 6B-6B of FIG. 5B.

As illustrated in FIGS. 5A to 6B, the developer container 32 includes a conveyance chamber 36 that accommodates the agitation member 34, and the conveyance chamber 36 serving as an accommodation chamber that accommodates toner extends over the entirety of the developer container 32 in the longitudinal direction (left-right direction). In addition, the conveyance chamber 36 is integrally formed with a frame member rotatably supporting the developing roller 31 and the supply roller 33, and accommodates developer to be borne on the developing roller 31. In addition, the developer container 32 includes a first projection portion 37 serving as a projection portion that projects upward from one end portion of the conveyance chamber 36 in the longitudinal direction and communicates with the conveyance chamber 36, and a second projection portion 38 that projects upward from the other end portion of the conveyance chamber 36 in the longitudinal direction. That is, the first projection portion 37 is provided at one end portion of the developer container 32 in the rotation axis direction of the developing roller 31, and projects toward the discharge tray 81 in a crossing direction crossing the rotation axis direction described above more than the center portion of the developer container 32. The second projection portion 38 is provided at the other end portion of the developer container 32 in the rotation axis direction of the developing roller 31, and projects toward the discharge tray 81 in the crossing direction more than the center portion of the developer container 32. In the present embodiment, the first projection portion 37 is formed on the left side of the developer container 32, and the second projection portion 38 is formed on the right side of the developer container 32. An attachment portion 57 to which the toner pack 40 can be attached is provided at an upper end portion (distal end portion) of the first projection portion 37, and a replenishment port 32*a* for replenishing the conveyance chamber 36 with toner from the toner pack 40 is defined in the attachment portion 57. The toner pack 40 can be attached to the attachment portion 57 in the state of being exposed to the outside of the apparatus.

The developer container 32 is configured such that toner supplied through the replenishment port 32*a* reaches the agitation member 34 by only its own weight. Here, "its own weight" means that it is configured that the toner reaches the agitation member 34 by its own weight even though an agitation member (conveyance member) that rotates or swings for conveying toner is not provided between the replenishment port 32*a* of the developer container 32 and the agitation member 34. In addition, in the developer container 32, the agitation member 34 serving as a conveyance member is disposed such that the agitation member 34 is the rotary member closest to the replenishment port 32*a* and the rotation thereof causes the toner in the conveyance chamber 36 to reach the developing roller 31 or the supply roller 33.

The first projection portion 37 and the second projection portion 38 extend obliquely upward from the conveyance chamber 36 from the front side of the apparatus. That is, the first projection portion 37 and the second projection portion 38 project downstream and upward in the discharge direction of the discharge roller pair 80. Therefore, the replenishment port 32*a* formed in the first projection portion 37 is disposed on the front side of the image forming apparatus 1, and thus toner replenishment operation for the developer container 32 can be performed easily.

Particularly, in the present embodiment, since the reading apparatus 200 openable and closable about the rear side of the apparatus is disposed above the opening/closing member 83, the space between the replenishment port 32*a* and the reading apparatus 200 can be used more efficiently by disposing the replenishment port 32*a* on the front side of the apparatus. Therefore, the operability for replenishing toner from the replenishment port 32*a* can be improved.

The upper portion of the first projection portion 37 and the upper portion of the second projection portion 38 are connected to each other by a grip portion 39 serving as a connection portion. A laser passage space SP, serving as a space, through which laser light L (see FIG. 1A) emitted from the scanner unit 11 (see FIG. 1A) toward the photosensitive drum 21 passes is defined between the grip portion 39 and the conveyance chamber 36. The laser passage space SP is adjacent to the first projection portion 37 in the rotation axis direction of the developing roller 31.

The grip portion 39 includes a pinching portion 39*a* that the user can grip by hooking a finger thereon, and the pinching portion 39*a* is formed to project upward from the top plate of the grip portion 39. The first projection portion 37 is formed to have a hollow shape, and the replenishment port 32*a* is defined in the upper surface thereof. The replenishment port 32*a* is configured to be connectable to the toner pack 40.

By providing the first projection portion 37, on a distal end portion of which the replenishment port 32*a* is defined, on one side of the developer container 32 in the longitudinal direction, the laser passage space SP that the laser light L emitted from the scanner unit 11 can pass through can be secured, and the image forming apparatus 1 can be miniaturized. In addition, since the second projection portion 38 is provided on the other side of the developer container 32 in the longitudinal direction, and the grip portion 39 that connects the first projection portion 37 and the second projection portion 38 to each other is formed, the usability for taking out the process cartridge 20 from the printer body 100 can be improved. To be noted, the second projection portion 38 may be formed in a hollow shape similarly to the first projection portion 37, or may be formed in a solid shape.

Figure 26:
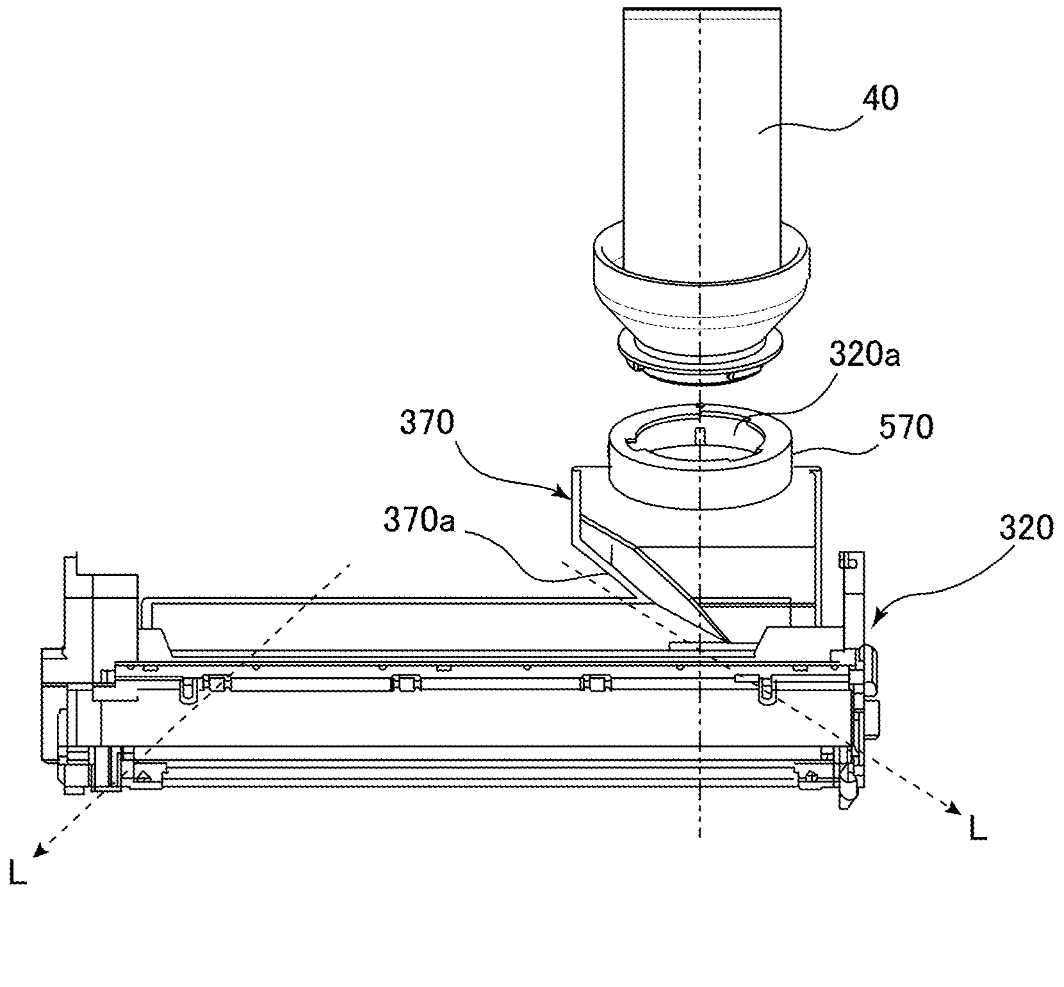
FIG. 26 is a perspective view of a developer container according to a modification example of the first embodiment.

FIG. 26 is a perspective view of a developer container 320 according to a modification example of the first embodiment. The developer container 320 includes a projection portion 370 disposed at an end portion in the longitudinal direction, and the projection portion 370 projects higher than a center portion of the developer container 320 in the longitudinal direction. An attachment portion 570 for attaching the toner pack 40 is provided on the projection portion 370, and a replenishment port 320*a* is provided in the attachment portion 570.

The projection portion 370 is different from the first projection portion 37 illustrated in FIG. 5B in that a recess portion 370*a* is provided thereon. The recess portion 370*a* is provided on a side surface of the projection portion 370, and is recessed in a direction from the center portion to an end portion of the developer container 320 in the longitudinal direction. Further, the recess amount of the recess portion 370*a* is larger at a position closer to the photosensitive drum 21. Here, it can be considered that in the case where the distance between the scanner unit 11 and the developer container 320 is increased, the irradiation region of the laser light L overlaps with the attachment portion 570 (replenishment port 320*a*) as viewed in the attachment direction of the toner pack 40. By providing the attachment portion 570 above the laser light L in the vertical direction such that the laser light L passes through the recess portion 370*a*, interference between the laser light L and the developer container 320 can be avoided. As a result of this, it is not necessary to move the projection portion 370 further toward the end portion in the longitudinal direction to avoid the interference with the laser light L, and thus the miniaturization of the apparatus can be realized.

As illustrated in FIGS. 5A to 6B, the toner pack 40 is configured to be attachable to and detachable from the attachment portion 57 of the first projection portion 37. In addition, the toner pack 40 includes a shutter member 41 provided at an opening portion and openable and closable, and a plurality of (in the present embodiment, three) protrusions 42 formed in correspondence with a plurality of (in the present embodiment, three) groove portions 32*b* defined in the attachment portion 57. In the case where the user replenishes the developer container 32 with toner, the user positions the toner pack 40 such that the protrusions 42 pass through the groove portions 32*b* of the attachment portion 57, and thus connects the toner pack 40 to the attachment portion 57. Further, when the toner pack 40 is rotated by 180° in this state, the shutter member 41 of the toner pack 40 abuts an unillustrated abutting portion of the attachment portion 57 to rotate with respect to the body of the toner pack 40, and thus the shutter member 41 is opened. As a result of this, toner accommodated in the toner pack 40 drops from the toner pack 40, and the dropped toner enters the first projection portion 37 having a hollow shape through the replenishment port 32*a*. To be noted, the shutter member 41 may be provided on the replenishment port 32*a*.

Figure 27:
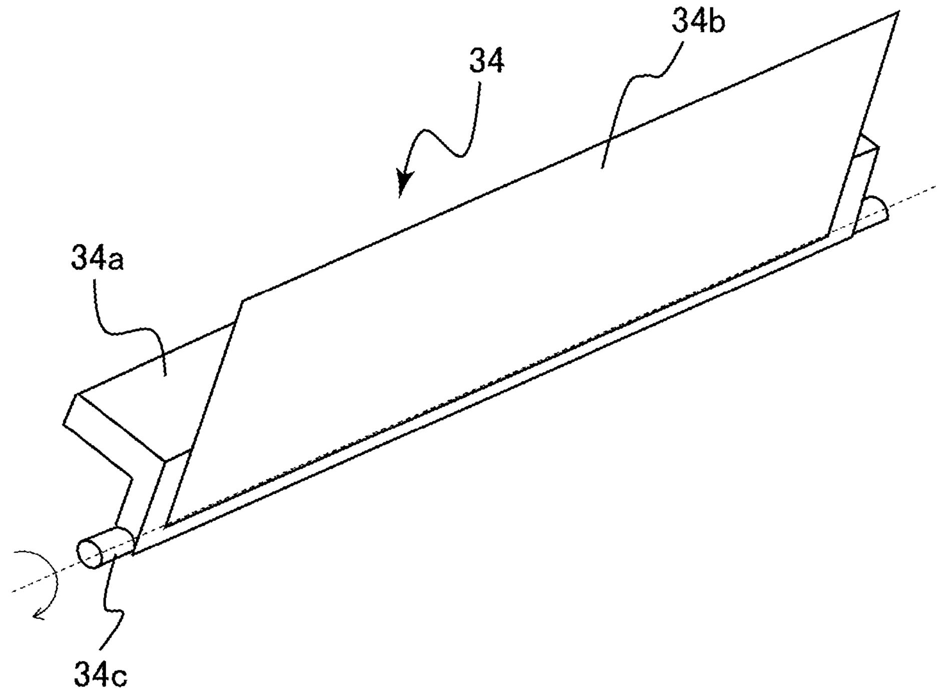
FIG. 27 is a perspective view of an agitation member according to the first embodiment.

The first projection portion 37 includes an inclined surface 37*a* at a position opposing to the opening of the replenishment port 32*a*, and the inclined surface 37*a* is inclined downward toward the conveyance chamber 36. Therefore, the toner supplied through the replenishment port 32*a* is guided to the conveyance chamber 36 by the inclined surface 37*a*. FIG. 27 is a perspective view of the agitation member 34. As illustrated in FIGS. 6 and 27, the agitation member 34 includes an agitation shaft 34*a* serving as a support portion extending in the longitudinal direction, and a blade portion 34*b* fixed to the agitation shaft 34*a* and extends radially outward from the agitation shaft 34*a*. The blade portion 34*b* as a flexible sheet is a sheet having flexibility. The agitation member 34 rotates about a shaft portion 34*c* of the agitation shaft 34*a*.

The toner replenished through the replenishment port 32*a* disposed upstream of the agitation member 34 in the conveyance direction is delivered to the developing roller 31 and the supply roller 33 in accordance with the rotation of the agitation member 34. The conveyance direction of the agitation member 34 is parallel to the longitudinal direction of the developer container 32. Although the replenishment port 32*a* and the first projection portion 37 are disposed at one end portion of the developer container 32 in the longitudinal direction, the toner spreads to the whole developer container 32 by repetitive rotation of the agitation member 34. To be noted, although the agitation member 34 is constituted by the agitation shaft 34*a* and the blade portion 34*b* in the present embodiment, an agitation shaft of a spiral shape may be used as an element for spreading the toner to the whole developer container 32.

Figure 7:
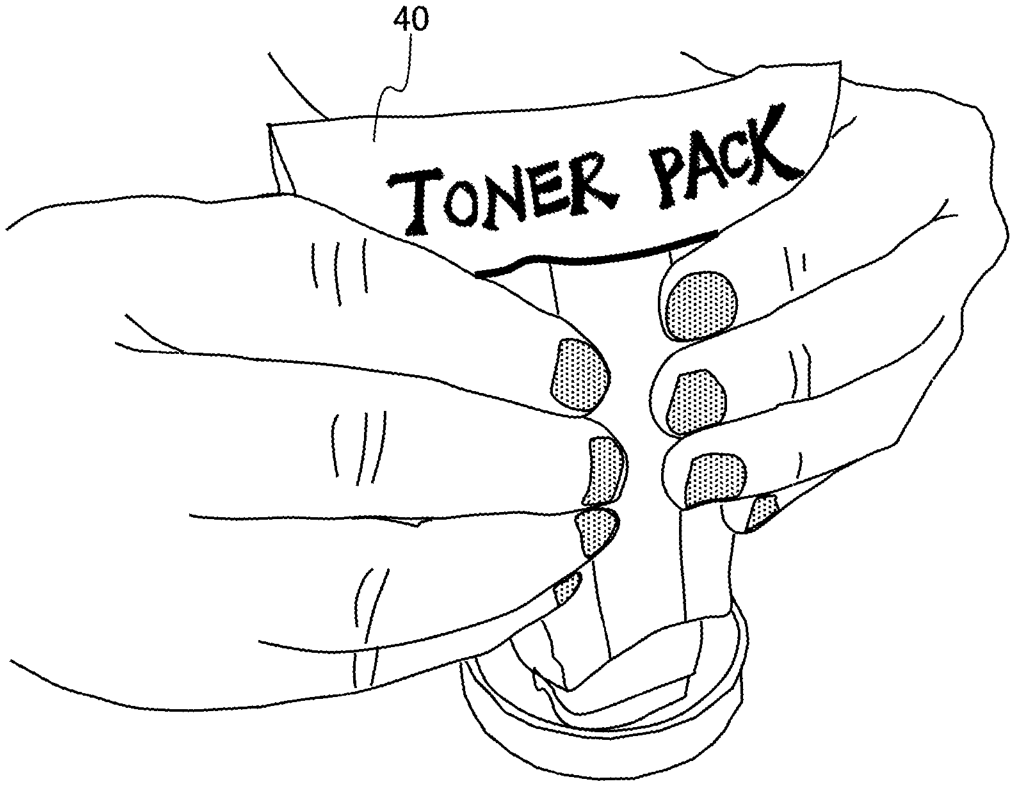
FIG. 7 is a perspective view of the toner pack.
Figure 8A:
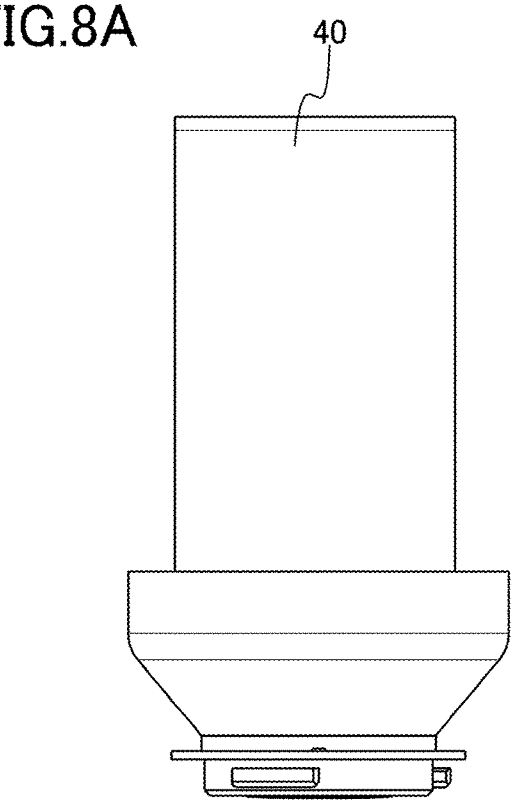
FIG. 8A is a front view of the toner pack.
Figure 8B:
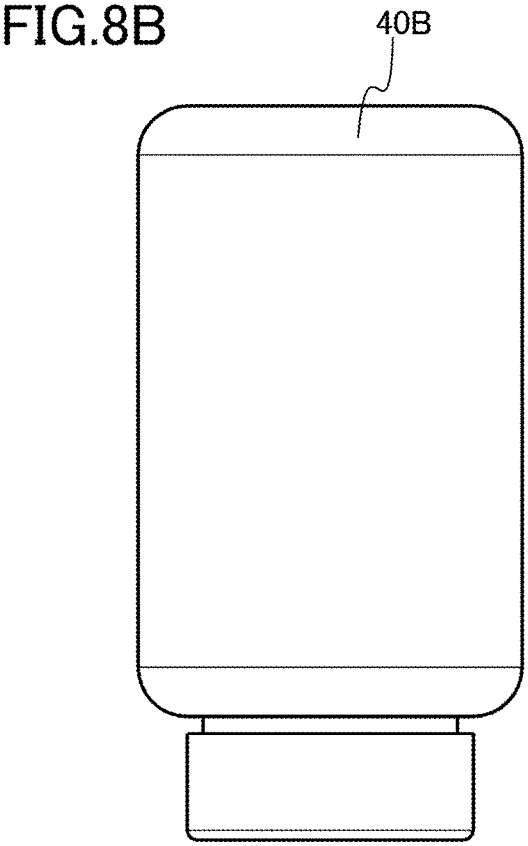
FIG. 8B is a front view of a first modification example of the toner pack.
Figure 8C:
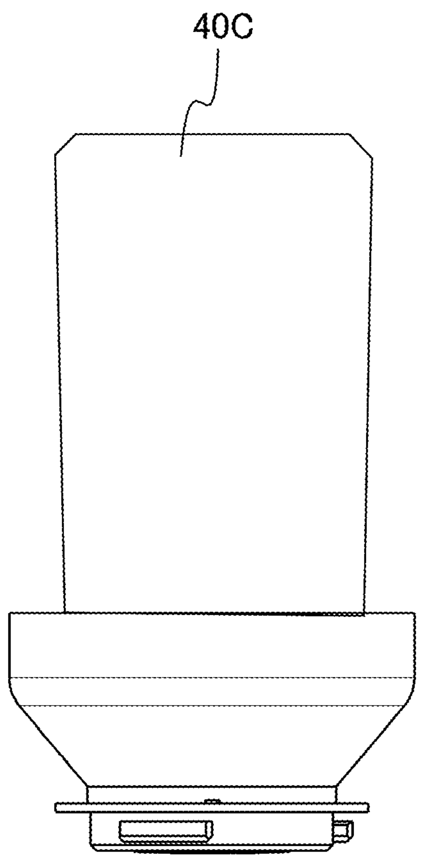
FIG. 8C is a front view of a second modification example of the toner pack.

Although the toner pack 40 is constituted by an easily deformable plastic bag as illustrated in FIGS. 7 and 8A in the present embodiment, this is not limiting. For example, the toner pack may be constituted by a bottle container 40B having an approximately cone shape as illustrated in FIG. 8B, or may be formed from a paper container 40C formed from paper as illustrated in FIG. 8C. In either case, the material and shape of the toner pack may be of any kind. In addition, as a method for discharging toner from the toner pack, it is preferable that the user squeeze the toner pack in the case of the toner pack 40 or the paper container 40C, and it is preferable that the user causes the toner to drop while vibrating the container by hitting the container or the like in the case of the bottle container 40B. In addition, a discharge mechanism may be provided in the bottle container 40B to discharge toner from the bottle container 40B. Further, the discharge mechanism may be configured to engage with the printer body 100 and receive a driving force from the printer body 100.

In addition, the shutter member 41 may be omitted from any of the toner packs, and a shutter member of a sliding type may be used instead of the shutter member 41 of a rotary type. In addition, the shutter member 41 may be configured to be broken when attaching the toner pack to the replenishment port 32*a* or rotating the toner pack in the attached state, or may be a detachable lid structure such as a sticker.

Detection Method for Toner Remainder Amount

Next, a method for detecting the toner remainder amount of the developer container 32 will be described with reference to FIGS. 9 to 11B. A first toner remainder amount sensor 51 and a second toner remainder amount sensor 52 that detect a state corresponding to the toner remainder amount in the developer container 32 are provided in the developing apparatus 30 of the present embodiment.

Figure 10:
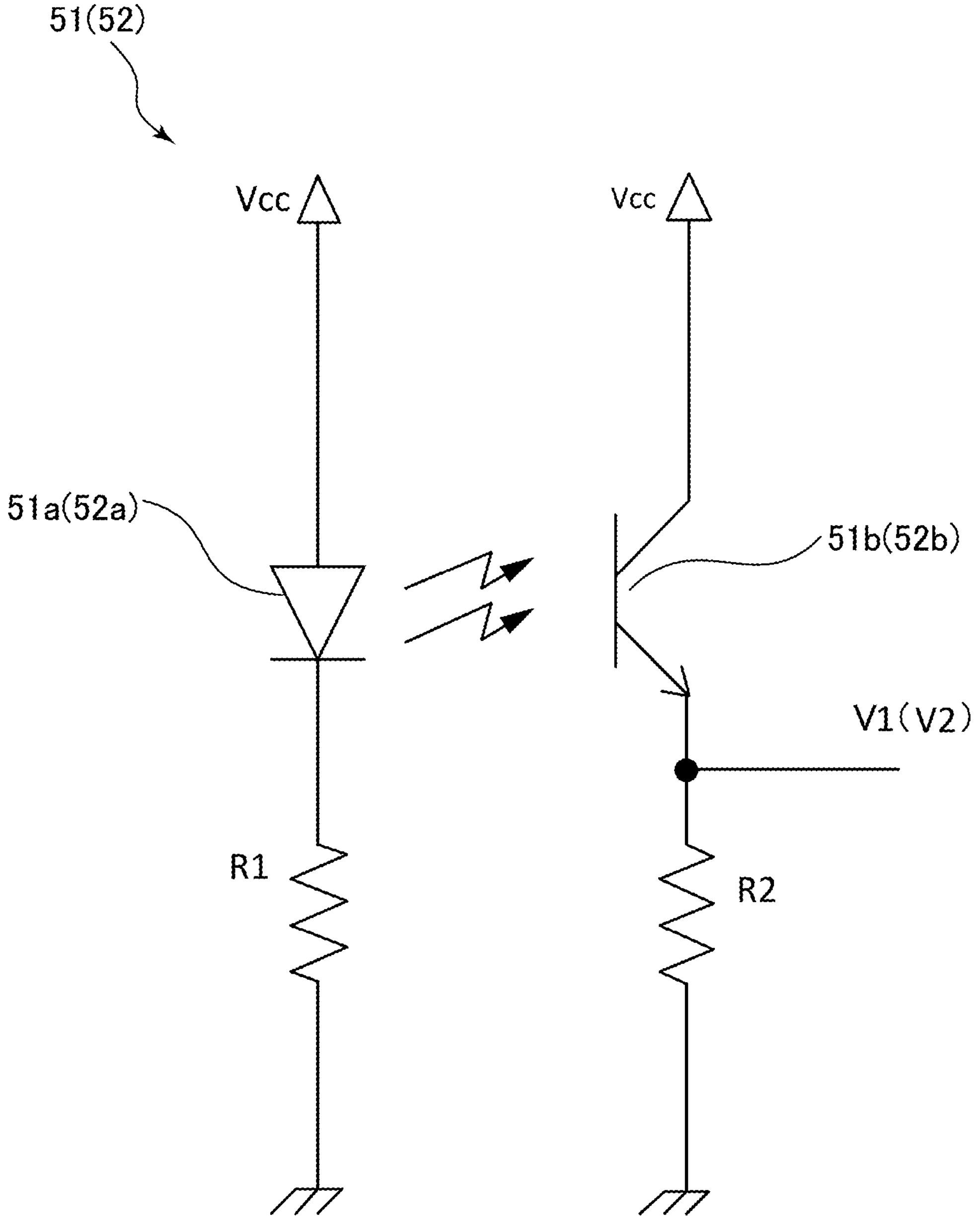
FIG. 10 is a circuit diagram of the first and second toner remainder amount sensors.

The first toner remainder amount sensor 51 includes a light emitting portion 51*a* and a light receiving portion 51*b*, and the second toner remainder amount sensor 52 includes a light emitting portion 52*a* and a light receiving portion 52*b*. FIG. 10 is a circuit diagram illustrating an example of a circuit configuration of the toner remainder amount sensors 51 and 52. To be noted, the circuit configuration of the first toner remainder amount sensor 51 will be described below, and description of the circuit configuration of the second toner remainder amount sensor 52 will be omitted.

Although an LED is used as the light emitting portion 51*a*, and a phototransistor that is switched to an ON state by light from the LED is used as the light receiving portion 51*b* in FIG. 10, this is not limiting. For example, a halogen lamp or fluorescent light may be used as the light emitting portion 51*a*, and a photodiode or an avalanche photodiode may be used as the light receiving portion 51*b*. To be noted, an unillustrated switch is provided between the light emitting portion 51*a* and a power source voltage Vcc, and by switching the switch on, the voltage from the power source voltage Vcc is applied to the light emitting portion 51*a*, and the light emitting portion 51*a* takes a power-supplied state. Meanwhile, an unillustrated switch is also provided between the light receiving portion 51*b* and the power source voltage Vcc, and by switching the switch on, the light receiving portion 51*b* takes a power-supplied state in accordance with a current corresponding to the amount of detected light.

Figure 9:
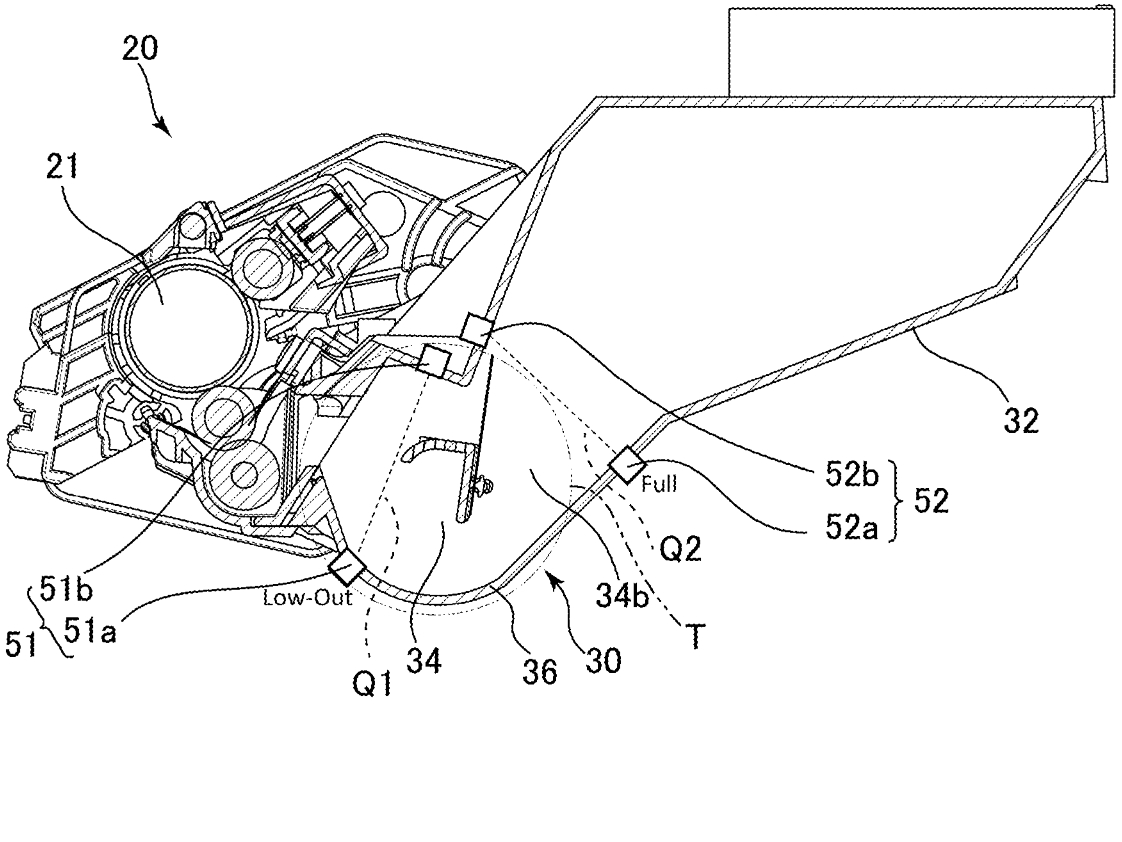
FIG. 9 is a section view of a first and second toner remainder amount sensors.

The light emitting portion 51*a* is connected to the power source voltage Vcc and a current-limiting resistor R1, and the light emitting portion 51*a* emits light in accordance with a current determined by the current-limiting resistor R1. As illustrated in FIG. 9, the light emitted from the light emitting portion 51*a* passes through an optical path Q1, and is received by the light receiving portion 51*b*. A collector terminal of the light receiving portion 51*b* is connected to the power source voltage Vcc, and an emitter terminal thereof is connected to a detection resistor R2. The light receiving portion 51*b* that is a phototransistor receives light emitted from the light emitting portion 51*a*, and outputs a signal (current) corresponding to the amount of received light. This signal is converted into a voltage V1 by the detection resistor R2, and is input to an A/D conversion portion 95 of a control portion 90 (see FIG. 12). To be noted, the light receiving portion 52*b* of the second toner remainder amount sensor 52 receives light emitted from the light emitting portion 52*a* and having passed through an optical path Q2, and a voltage V2 corresponding to the amount of received light is output and input to the A/D conversion portion 95 of the control portion 90.

The control portion 90 (CPU 91) determines, on the basis of the input voltage level, whether or not the light receiving portions 51*b* and 52*b* have received light from the light emitting portions 51*a* and 51*b*. The control portion 90 (CPU 91) calculates the toner amount in the developer container 32 on the basis of the length of time in which each light is detected by the light receiving portion 51*b* and 52*b* and the light intensity of the received light when the toner in the developer container 32 is agitated for a certain time by the agitation member 34. That is, the ROM 93 stores in advance a table that can output a toner remainder amount in accordance with the light reception time and the light intensity of the time when the toner is conveyed by the agitation member 34, and the control portion 90 estimates/calculates the toner remainder amount on the basis of the input to the A/D conversion portion 95 and the table.

More specifically, the optical path Q1 of the first toner remainder amount sensor 51 is set to cross a rotation trajectory T of the agitation member 34. In addition, time in which light in the optical path Q1 is blocked by toner hit up by the agitation member 34, that is, time in which the light receiving portion 51*b* does not detect the light from the light emitting portion 51*a* in each rotation of the agitation member 34 changes depending on the toner remainder amount. In addition, the received light intensity of the light receiving portion 51*b* also changes depending on the toner remainder amount.

Figure 11A:
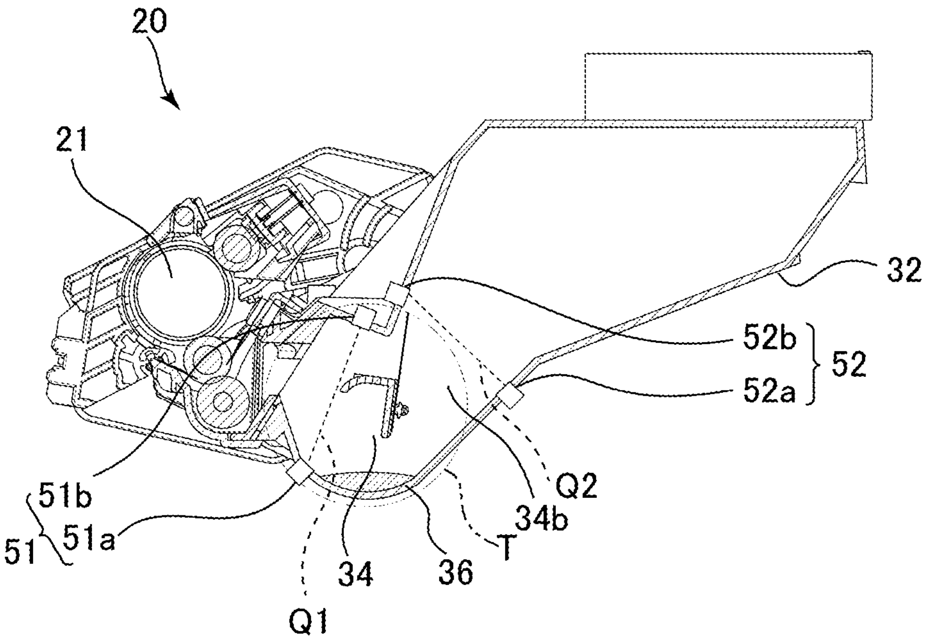
FIG. 11A is a section view of the developer container in a state in which the toner remainder amount is small.

That is, when the toner remainder amount is large, the optical path Q1 is more likely to be blocked by toner, thus the time in which the light receiving portion 51*b* receives light becomes shorter, and the received light intensity of the light received by the light receiving portion 51*b* becomes lower. In contrast, conversely in the case where the toner remainder amount is small, the time in which the light receiving portion 51*b* receives light becomes longer, and the received light intensity of the light received by the light receiving portion 51*b* becomes higher. Therefore, the control portion 90 can determine whether the toner remainder amount is at the Low level or the Mid level on the basis of the light receiving time and the received light intensity of the light receiving portion 51*b* as will be described later. For example, as illustrated in FIG. 11A, in the case where the amount of toner in the conveyance chamber 36 of the developer container 32 is small, it is determined that the toner remainder amount is at the Low level. To be noted, although the second toner remainder amount sensor 52 is disposed not to cross the rotation trajectory T of the agitation member 34 in the description above, the second toner remainder amount sensor 52 may be disposed to cross the rotation trajectory T of the agitation member 34 similarly to the first toner remainder amount sensor 51 described above.

Figure 11B:
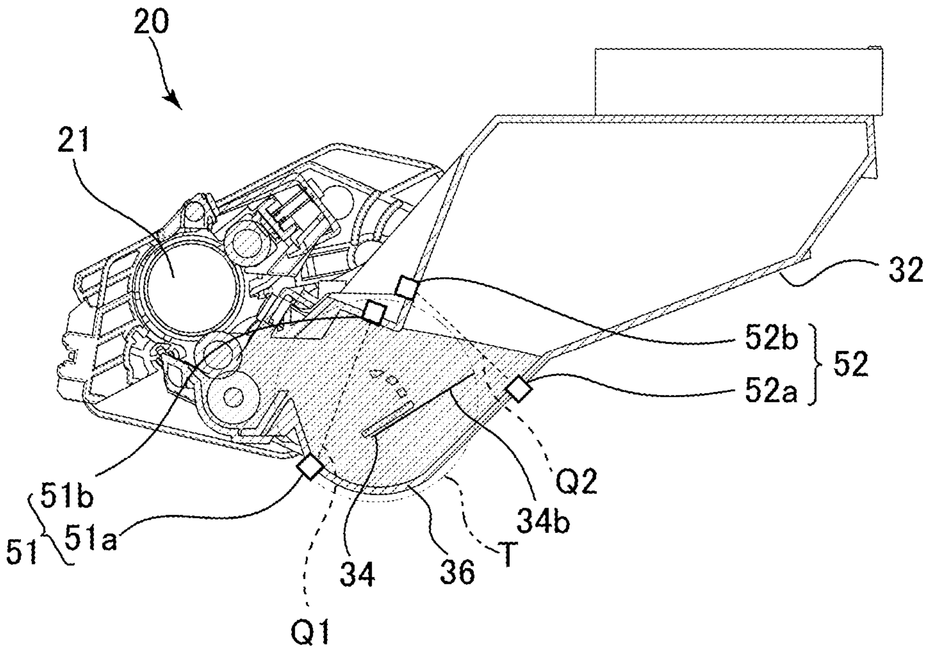
FIG. 11B is a section view of the developer container in a state in which the toner remainder amount is large.

In addition, the optical path Q2 of the second toner remainder amount sensor 52 is set to be above the rotation trajectory T so as not to cross the rotation trajectory T of the agitation member 34. Further, the light receiving portion 52*b* of the second toner remainder amount sensor 52 does not detect the light from the light emitting portion 52*a* in the case where light in the optical path Q2 is blocked by toner, and detects the light from the light emitting portion 52*a* in the case where light in the optical path Q2 is not blocked by toner. Therefore, regardless of the rotation operation of the agitation member 34, the control portion 90 determines whether or not the toner remainder amount is at a Full level on the basis of whether or not the light receiving portion 52*b* has received light as will be described later. For example, as illustrated in FIG. 11B, in the case where the amount of toner in the conveyance chamber 36 of the developer container 32 is large, it is determined that the toner remainder amount is at the Full level. To be noted, although the second toner remainder amount sensor 52 is disposed not to cross the rotation trajectory T of the agitation member 34 in the description above, the second toner remainder amount sensor 52 may be disposed to cross the rotation trajectory T of the agitation member 34 similarly to the first toner remainder amount sensor 51 described above.

To be noted, the detection/estimation method for the toner remainder amount is not limited to the method of optical toner remainder amount detection described with reference to FIG. 9, and various known types of detection/estimation methods for toner remainder amount can be employed. For example, the toner remainder amount may be detected/estimated by disposing two or more metal plates or conductive resin sheets extending in the longitudinal direction of the developing roller on the inner wall of the developer container 32 serving as a frame member and measuring the electrostatic capacity between two metal plates or conductive resin sheets. Alternatively, a load cell supporting the developing apparatus 30 from below may be provided and the CPU 91 may calculate the toner remainder amount by subtracting the weight of the developing apparatus 30 of the case where there is no toner therein from the weight measured by the load cell. In addition, the first toner remainder amount sensor 51 may be omitted, and the control portion 90 (CPU 91) may calculate the toner remainder amount from the detection result of the second toner remainder amount sensor 52 and the emission status of the laser light.

Control System of Image Forming Apparatus

Figure 12:
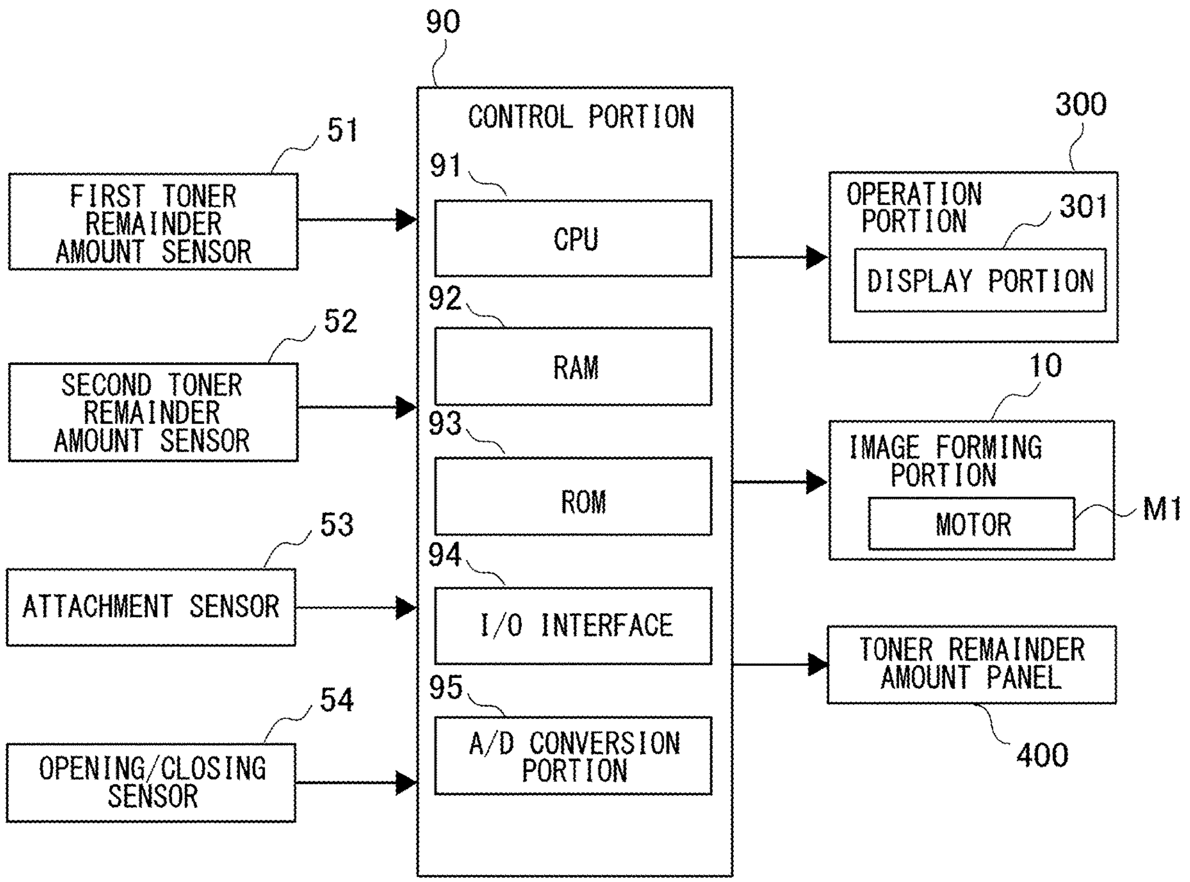
FIG. 12 is a block diagram illustrating a control system of the image forming apparatus.

FIG. 12 is a block diagram illustrating a control system of the image forming apparatus 1. The control portion 90 of the image forming apparatus 1 includes a CPU 91 serving as a calculation device, a RAM 92 used as a work area of the CPU 91, and a ROM 93 storing various programs. In addition, the control portion 90 includes an I/O interface 94 serving as an input/output port connected to an external device, and the A/D conversion portion 95 that converts an analog signal into a digital signal.

The first toner remainder amount sensor 51, the second toner remainder amount sensor 52, an attachment sensor 53, and an opening/closing sensor 54 are connected to the input side of the control portion 90, and the attachment sensor 53 detects attachment of the toner pack 40 to the replenishment port 32*a* of the developer container 32. For example, the attachment sensor 53 is constituted by a pressure sensor that is provided at the replenishment port 32*a* and outputs a detection signal by being pressed by the protrusions 42 of the toner pack 40. In addition, the opening/closing sensor 54 detects whether or not the opening/closing member 83 has been opened with respect to the top cover 82. The opening/closing sensor 54 is constituted by, for example, a pressure sensor or a magnetic sensor.

In addition, the control portion 90 is connected to the operation portion 300, the image forming portion 10, and a toner remainder amount panel 400 serving as a notification portion capable of notifying information about the toner remainder amount. The operation portion 300 includes a display portion 301 capable of displaying various setting screens, physical keys, and so forth. The display portion 301 is constituted by, for example, a liquid crystal panel. The image forming portion 10 includes a motor M1 serving as a drive source that drives the photosensitive drum 21, the developing roller 31, the supply roller 33, the agitation member 34, and so forth. To be noted, the photosensitive drum 21, the developing roller 31, the supply roller 33, and the agitation member 34 may be configured to be each driven by a different motor.

The toner remainder amount panel 400 is provided on the right side of the front surface of the casing of the printer body 100, that is, on the opposite side to the operation portion 300 disposed on the left side as illustrated in FIGS. 1B and 17, and displays information about the toner remainder amount in the developer container 32. In the present embodiment, the toner remainder amount panel 400 is a panel member constituted by a plurality of (in the present embodiment, three) indicators arranged in the up-down direction, and the indicators respectively correspond to the Low level, the Mid level, and the Full level.

Figure 17A:
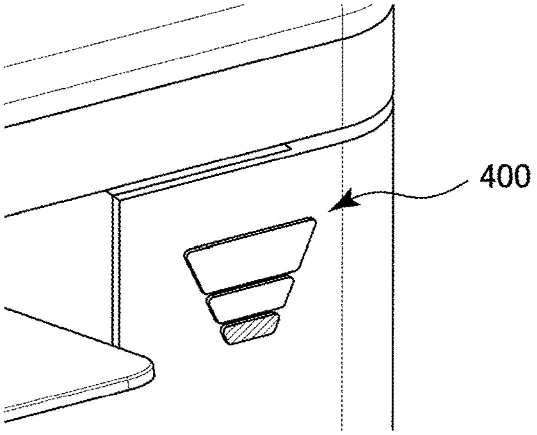
FIG. 17A is a perspective view of a toner remainder amount panel in a state in which the toner remainder amount is at a Low level.
Figure 17B:
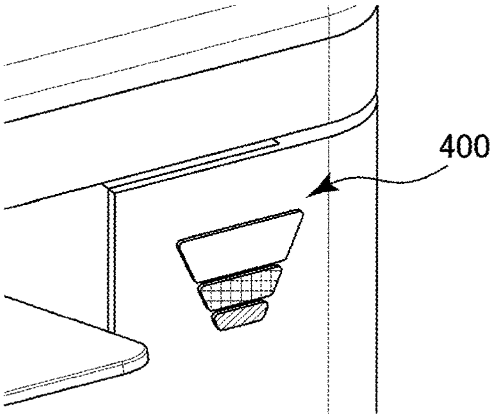
FIG. 17B is a perspective view of the toner remainder amount panel in a state in which the toner remainder amount is at a Mid level.
Figure 17C:
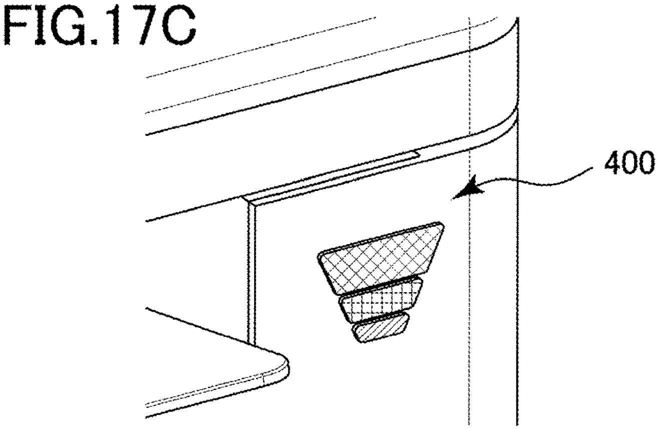
FIG. 17C is a perspective view of the toner remainder amount panel in a state in which the toner remainder amount is at a Full level.

That is, as illustrated in FIG. 17A, in the case where only the bottom indicator is on, it is indicated that the toner remainder amount of the developer container 32 is at the Low level serving as a third state. As illustrated in FIG. 17B, in the case where the bottom and middle indicators are on and the top indicator is off, it is indicated that the toner remainder amount of the developer container 32 is at the Mid level serving as a second state. In the case where all the three indicators are on as illustrated in FIG. 17C, it is indicated that the toner remainder amount of the developer container 32 is at the Full level serving as a first state. To be noted, the toner remainder amount panel 400 is not limited to a liquid crystal panel and may be constituted by a light source such as an LED or an incandescent lamp and a diffusing lens. To be noted, although description has been given as a notification portion indicating the toner remainder amount in the example illustrated in FIG. 17, this is not limiting. For example, the indication of FIG. 17A may indicate that toner replenishment is needed, the indication of FIG. 17B may indicate that toner replenishment is not needed, and the indication of FIG. 17C may indicate that toner has been sufficiently replenished.

Toner Replenishment Process

Figure 13:
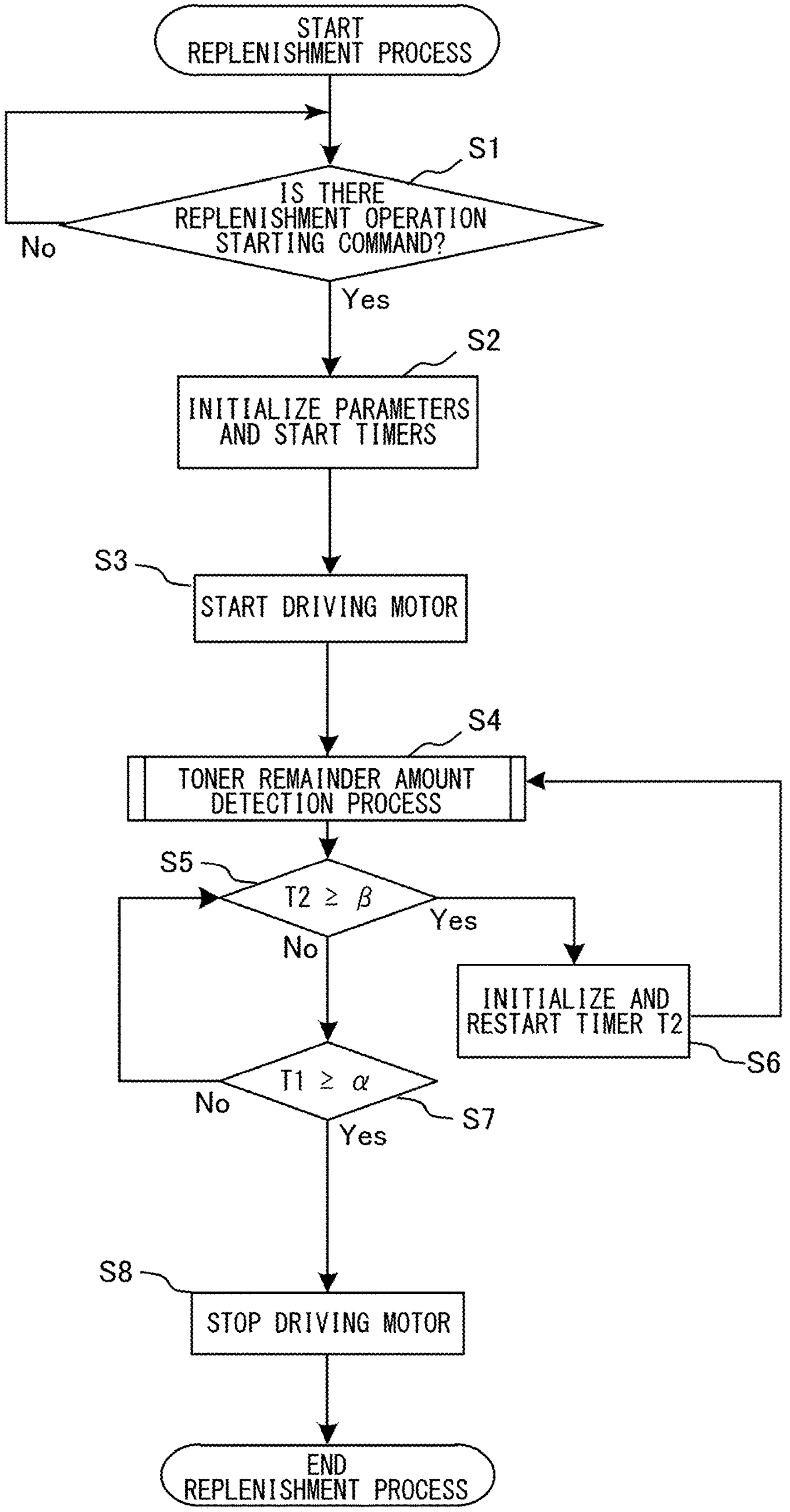
FIG. 13 is a flowchart illustrating a toner replenishment process.
Figure 15:
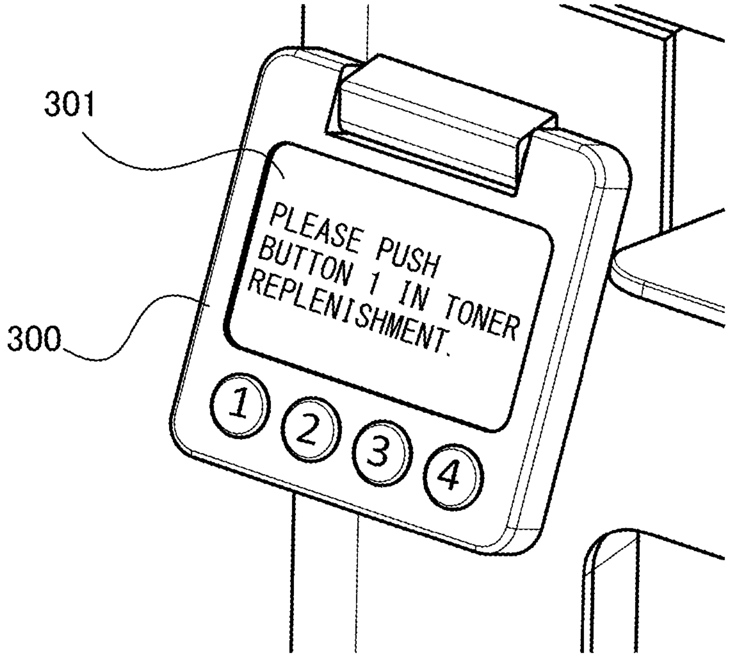
FIG. 15 is a perspective view of an operation portion.

Next, a toner replenishment process of replenishing the developer container 32 with toner in the toner pack 40 will be described. As illustrated in FIG. 13, when the toner replenishment process is started, the control portion 90 determines whether or not a replenishment operation starting command has been issued (step S1). In the present embodiment, the replenishment operation starting command is a user operation through the operation portion 300 as illustrated in FIG. 15. Specifically, the replenishment operation starting command is output by the user operating the operation portion 300 and thus pushing a button 1 in a state in which the display portion 301 is displaying a message prompting operation of the button 1.

To be noted, at this time, since the toner pack 40 is attached to the replenishment port 32*a* of the developer container 32, the opening/closing member 83 is open. Since the operation portion 300 and the replenishment port 32*a* are both disposed on the left side of the apparatus, the toner replenishment operation using the toner pack 40 can be easily performed while operating the operation portion 300. In addition, when the opening/closing sensor 54 detects that the opening/closing member 83 has been opened, the control portion 90 prohibits and stops the image forming operation by the image forming apparatus 1. Therefore, in the state in which the opening/closing member 83 is open, the conveyance rollers, the photosensitive drum 21, the scanner unit 11, and so forth of the image forming apparatus 1 are stopped.

To be noted, the replenishment operation starting command is not limited to the pushing operation on the button 1, and the replenishment operation starting command may be a touch operation on the display portion 301, or the operation starting command may be output in response to detection of the attachment of the toner pack 40 to the replenishment port 32*a* by the attachment sensor 53. In addition, a sensor that detects that the shutter member 41 of the toner pack 40 has been opened may be provided, and the replenishment operation starting command may be output on the basis of the detection result of this sensor. In addition, the replenishment operation starting command may be output on the basis of detection of an opening operation on the opening/closing member 83 by the opening/closing sensor 54. In addition, a configuration in which when the opening/closing member 83 is opened, the high-voltage power source applied to the process cartridge 20 is switched off such that only the motor M1 that drives the agitation member 34 can be driven may be employed.

In the case where it has been determined that the replenishment operation starting command has been issued (step S1: Yes), the control portion 90 initializes parameters of timers T1 and T2 that will be described later to initial values (for example, zero), and starts the timers T1 and T2 (step S2). Then, the control portion 90 drives the motor M1 (step S3), and the agitation member 34 rotates.

Figure 14:
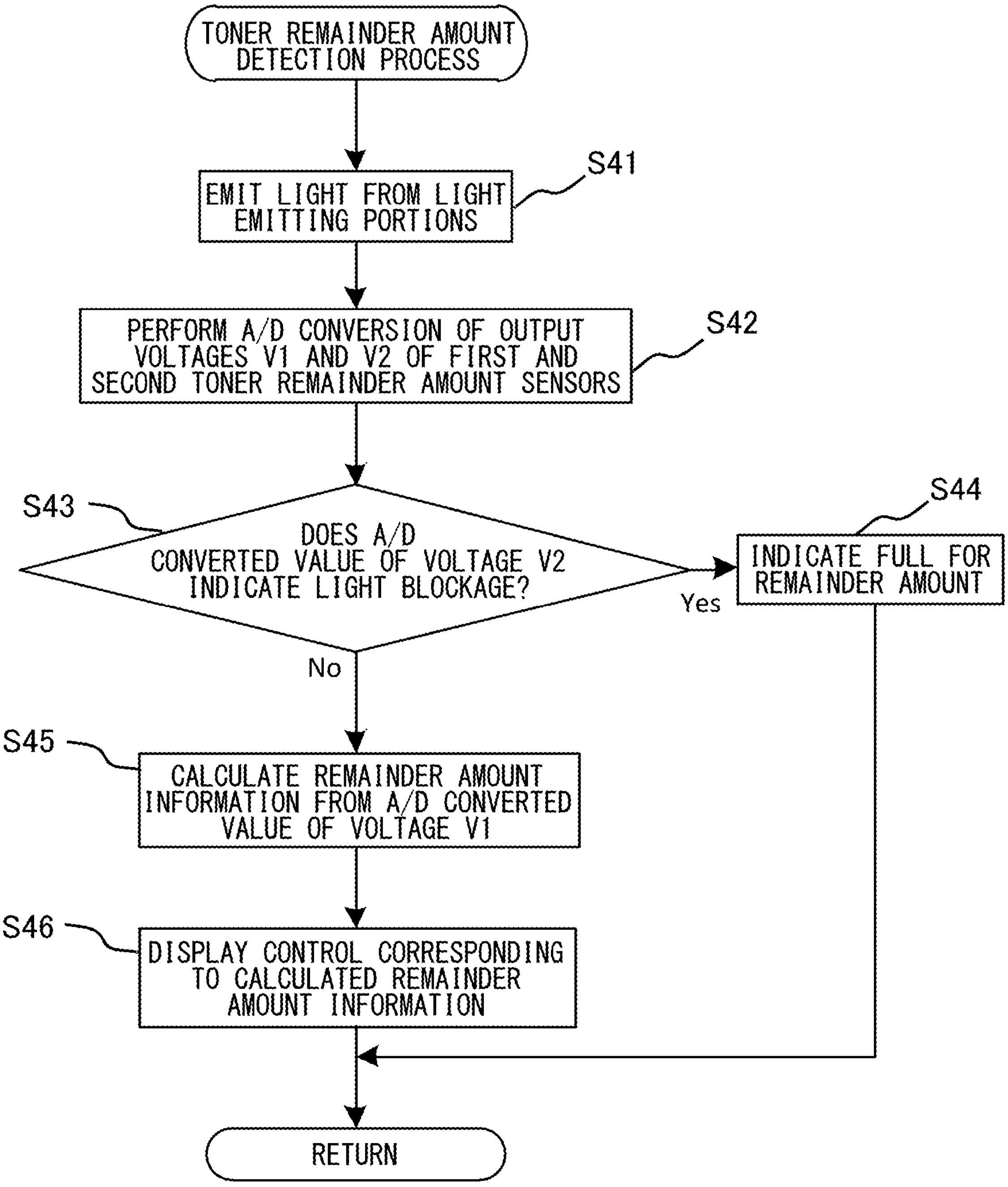
FIG. 14 is a flowchart illustrating a toner remainder amount detection process.

Next, the control portion 90 performs the toner remainder amount detection process (step S4). When the toner remainder amount detection process is performed, as illustrated in FIG. 14, the control portion 90 causes the light emitting portions 51*a* and 52*a* of the first toner remainder amount sensor 51 and the second toner remainder amount sensor 52 to emit light (step S41). Then, the control portion 90 converts voltages V1 and V2 respectively output from the light receiving portions 51*b* and 52*b* of the first toner remainder amount sensor 51 and the second toner remainder amount sensor 52 into digital signals (hereinafter referred to as A/D converted values) by the A/D conversion portion 95 (step S42).

Next, the control portion 90 determines whether or not the A/D converted value of the voltage V2 indicates that light in the optical path Q2 is blocked (step S43). In the case where it is indicated that light in the optical path Q2 is blocked (step S43: Yes), the control portion 90 causes the toner remainder amount panel 400 to indicate that the toner remainder amount is at the Full level (step S44). That is, as illustrated in FIG. 17C, all the three indicators of the toner remainder amount panel 400 become on.

In the case where the A/D converted value of the voltage V2 does not indicate that light in the optical path Q2 is blocked (step S43: No), the control portion 90 calculates the toner remainder amount information in the developer container 32 on the basis of the A/D converted value of the voltage V1 (step S45). Then, the control portion 90 causes the toner remainder amount panel 400 to indicate that the toner remainder amount is at the Low level or the Mid level on the basis of the calculated toner remainder amount information (step S46). When step S44 or step S46 is completed, the toner remainder amount detection process is finished. That is, the first toner remainder amount sensor 51 and the second toner remainder amount sensor 52 serving as detection portions output remainder amount information corresponding to the amount of developer accommodated in the developer container 32 while the agitation member 34 is operating.

Next, the control portion 90 determines whether or not the timer T2 is at a threshold value β or more as illustrated in FIG. 13 (step S5). The threshold value β is a value that is set in advance, and corresponds to an interval at which the toner remainder amount detection process is repeatedly performed. To be noted, α>β holds. In the case where the timer T2 is at the threshold value β or more, (step S5: Yes), the control portion 90 initializes and restarts the timer T2 (step S6), and returns to step S4. That is, each time the timer T2 reaches the threshold value β, the toner remainder amount detection process (step S4) is repeatedly performed. For example, in the case where the threshold value β is set to 1 second, the toner remainder amount detection process is repeatedly performed every 1 second in steps S4, S5, and S6.

In addition, in the case where the timer T2 is less than the threshold value β (step S5: No), the control portion 90 determines whether or not the timer T1 is at a threshold value α or more (step S7). The threshold value α is a value that is set in advance, and corresponds to the driving time of the motor M1 and the agitation member 34 in the toner replenishment process. In the case where the timer T1 is less than the threshold value α (step S7: No), the process returns to step S5. In the case where the timer T1 is at the threshold value α or more (step S7: Yes), the control portion 90 stops the driving of the motor M1 (step S8), and finishes the toner replenishment process. For example, in the case where the threshold value α is set to 10 seconds, the time from when the motor M1 starts driving in step S3 to when the motor M1 is stopped in step S8 is 10 seconds.

In the case where toner drops from the toner pack 40 into the developer container 32 in the toner replenishment process described above as illustrated in FIG. 16A, the toner enters the conveyance chamber 36 through the first projection portion 37. Since the replenishment port 32*a* and the first projection portion 37 are disposed at one end portion of the developer container 32 in the longitudinal direction, toner is collectively supplied to the one end portion side of the conveyance chamber 36.

Here, a case where the agitation member 34 is not rotating when toner is supplied to the conveyance chamber 36 will be considered. In the case where toner is caused to drop from the toner pack 40 into the developer container 32, if the agitation member 34 is not rotated in the conveyance chamber 36 accommodating toner, it takes time for the dropped toner to spread to the entirety of the photosensitive drum 21 in the longitudinal direction. If this time is long, it takes time for the user performing the toner replenishment operation to confirm that the conveyance chamber 36 has been replenished with toner, which degrades the usability.

Therefore, in the present embodiment, the agitation member 34 is driven for a predetermined time (threshold value α) since the start of replenishment in the toner replenishment process. As a result of this, as illustrated in FIGS. 16B and 16C, toner supplied from the toner pack 40 to one end portion of the developer container 32 is quickly flattened by the agitation member 34 in the entirety of the conveyance chamber 36 of the developer container 32 in the longitudinal direction. Therefore, the time the user takes to confirm that toner replenishment has been performed can be shortened, and the usability can be improved. In addition, since toner accommodated in the developer container 32 is flattened, the precision of the toner remainder amount information from the first toner remainder amount sensor 51 and the second toner remainder amount sensor 52 can be improved.

Then, during the toner replenishment process, the toner remainder amount information in the developer container 32 is detected by the first toner remainder amount sensor 51 and the second toner remainder amount sensor 52 every predetermined time (threshold value β). For example, as illustrated in FIG. 17A, the user replenishes the developer container 32 with toner from the toner pack 40 in a state in which the toner remainder amount panel 400 indicates that the toner remainder amount is at the Low level.

Then, after the toner remainder amount panel 400 indicates that the toner remainder amount is at the Mid level as illustrated in FIG. 17B, the toner remainder amount panel 400 indicates that the toner remainder amount is at the Full level as illustrated in FIG. 17C. As a result of this, the user can reliably recognize that the developer container 32 has been replenished with toner from the toner pack 40, and the usability can be improved.

Figure 16A:
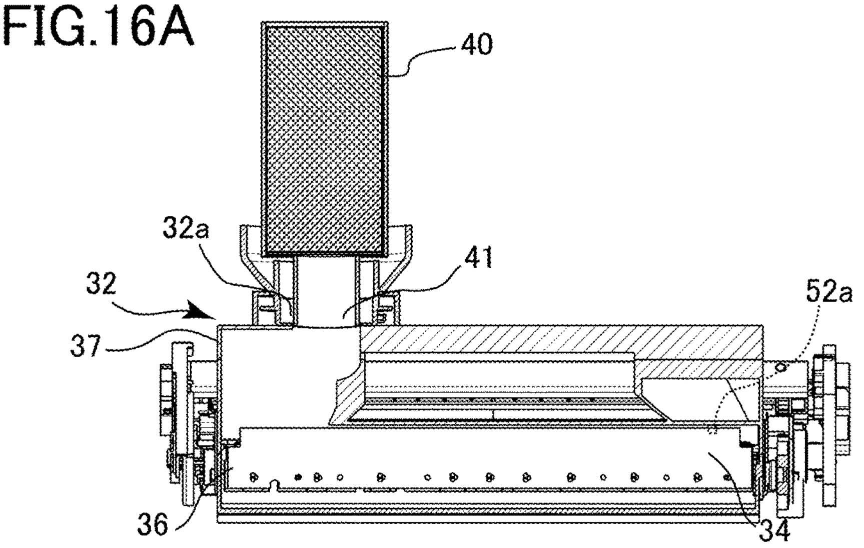
FIG. 16A is a section view illustrating a state in which the toner pack is attached to a replenishment port.
Figure 16B:
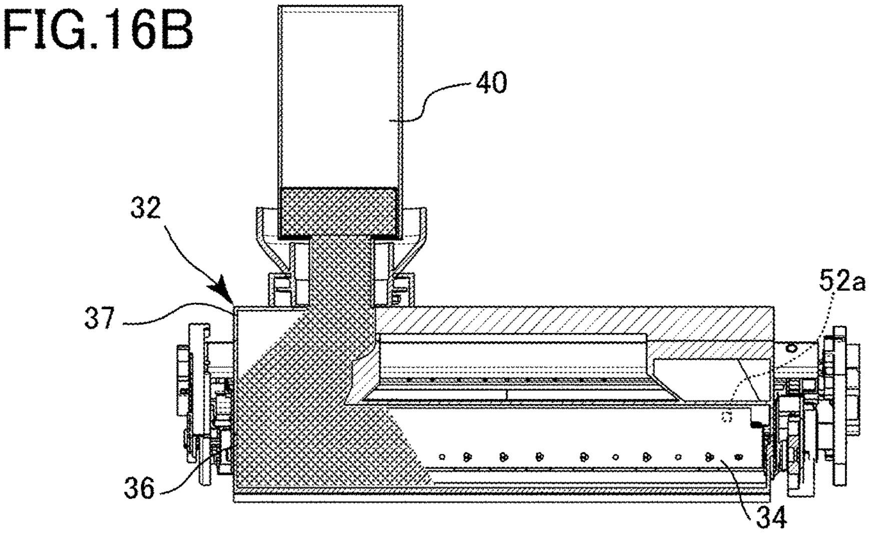
FIG. 16B is a section view illustrating a state in which toner has started dropping from the toner pack.
Figure 16C:
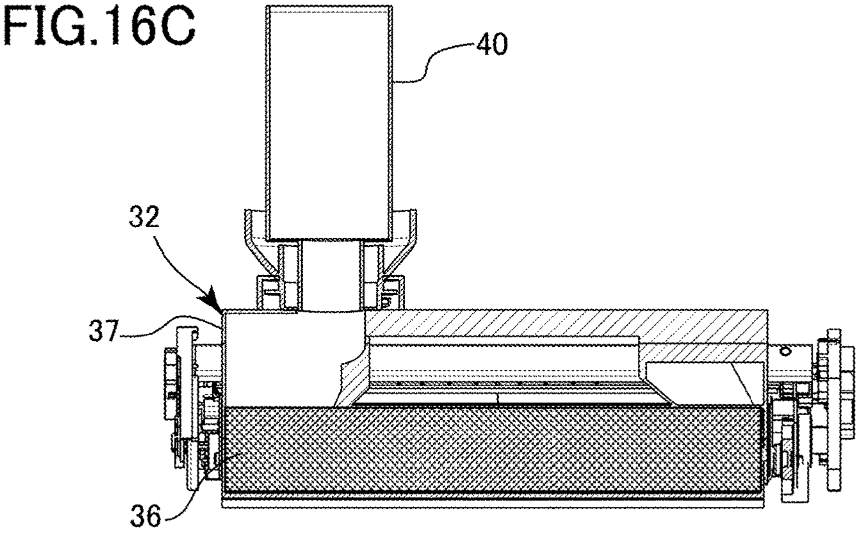
FIG. 16C is a section view illustrating a state in which the developer container has been replenished with all toner in the toner pack.

Here, section views of FIGS. 16A to 16C indicates 16A-16A section of FIG. 6. FIGS. 16A and 16B illustrate that the light emitting portion 52*a* is disposed at the right end of the photosensitive drum 21 in the longitudinal direction. In addition, the light emitting portion 51*a* and the light receiving portions 51*b* and 52*b* are disposed at the same/approximately the same position in the longitudinal direction of the photosensitive drum 21. Due to sensor arrangement restriction in the apparatus body, the sensors might be arranged as illustrated in FIGS. 16A and 16B in some cases. Also in such cases, the usability can be improved as described above by the rotation of the agitation member 34 in the toner replenishment.

In addition, in some cases, a sensor might be disposed approximately right under the replenishment port 32*a*. In such a case, as illustrated in FIG. 16B, more of the replenished toner might be distributed on the left side and it might take more time to flatten the toner surface in the entirety of the photosensitive drum 21 in the longitudinal direction. To detect the toner replenishment state accurately, the toner surface needs to be flattened in the entire region in the longitudinal direction of the photosensitive drum 21. However, even in such a case, in the present embodiment, the rotation of the agitation member 34 in toner replenishment flattens the toner surface in the entire region in the longitudinal direction of the photosensitive drum 21, and the usability can be improved.

Figure 18A:
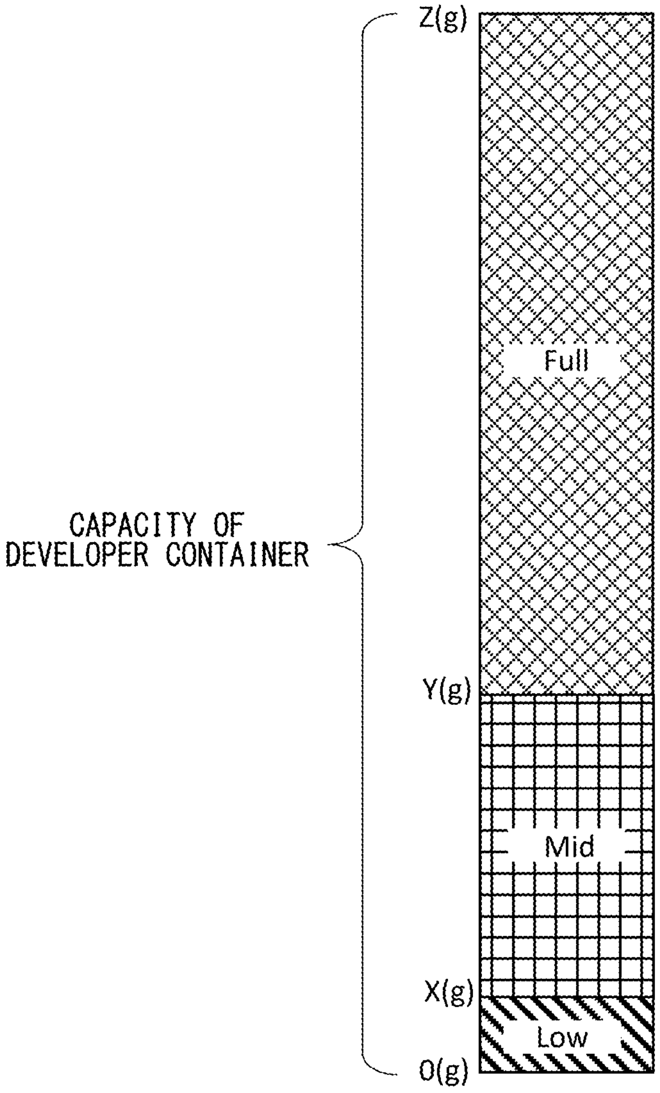
FIG. 18A is a graph illustrating a relationship between the capacity of the developer container and the toner remainder amount level.

Relationship Between Amount of Toner Charged into Toner Pack and Capacity of Developer Container Next, the relationship between the amount of toner charged into the toner pack 40 and the capacity of the developer container 32 will be described. The developer container 32 is capable of accommodating toner of Z [g] as illustrated in FIG. 18A. To be noted, although illustration is given in terms of grams (g) in FIGS. 18A to 18C, the unit may be converted into a unit indicating capacity such as milliliters (ml).

In the case where the developer container 32 accommodates toner of 0 [g] to X [g], the toner remainder amount panel 400 indicates the Low level on the basis of the detection results of the first toner remainder amount sensor 51 and the second toner remainder amount sensor 52. X [g] corresponds to a second amount, and the toner amount of 0 [g] to X [g] corresponds to a toner amount smaller than the second amount.

In the case where the developer container 32 accommodates toner of X [g] to Y [g], the toner remainder amount panel 400 indicates the Mid level on the basis of the detection result of the first toner remainder amount sensor 51 and the second toner remainder amount sensor 52. Y [g] corresponds to a first amount, and a toner amount of X [g] to Y [g] corresponds to a toner amount smaller than the first amount.

In the case where the developer container 32 accommodates toner of Y [g] or more, the toner remainder amount panel 400 indicates the Full level on the basis of the detection result of the first toner remainder amount sensor 51 and the second toner remainder amount sensor 52. The toner amount of Y [g] or more corresponds to a toner amount of first amount or more.

Figure 18B:
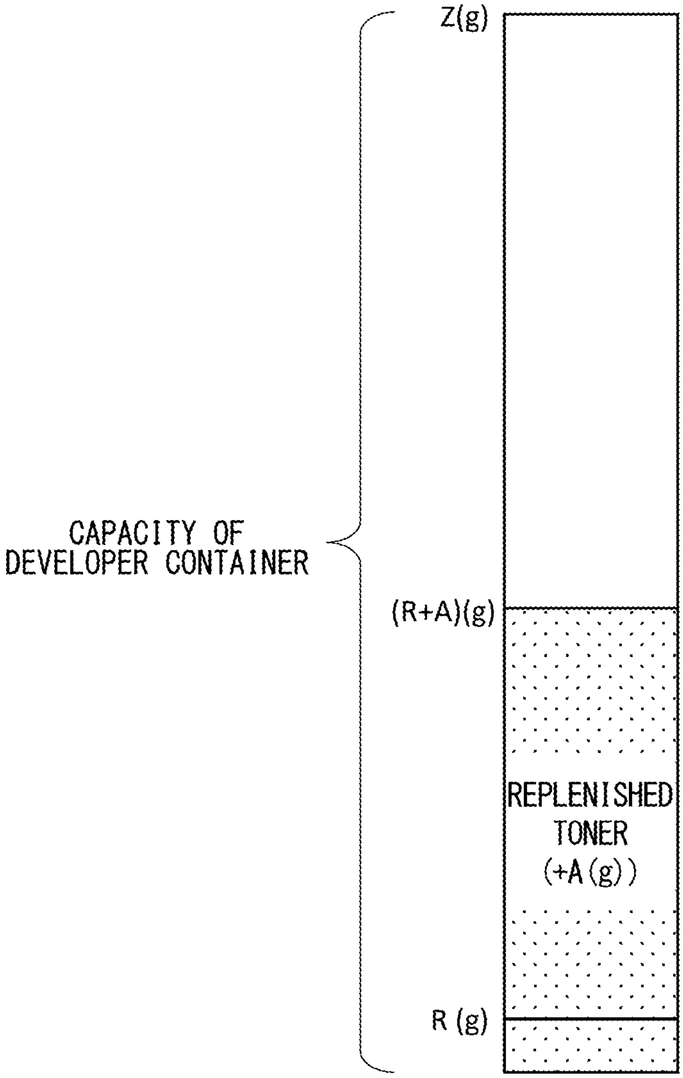
FIG. 18B is a graph illustrating a toner remainder amount when toner is replenished from a toner pack of a small capacity.
Figure 18C:
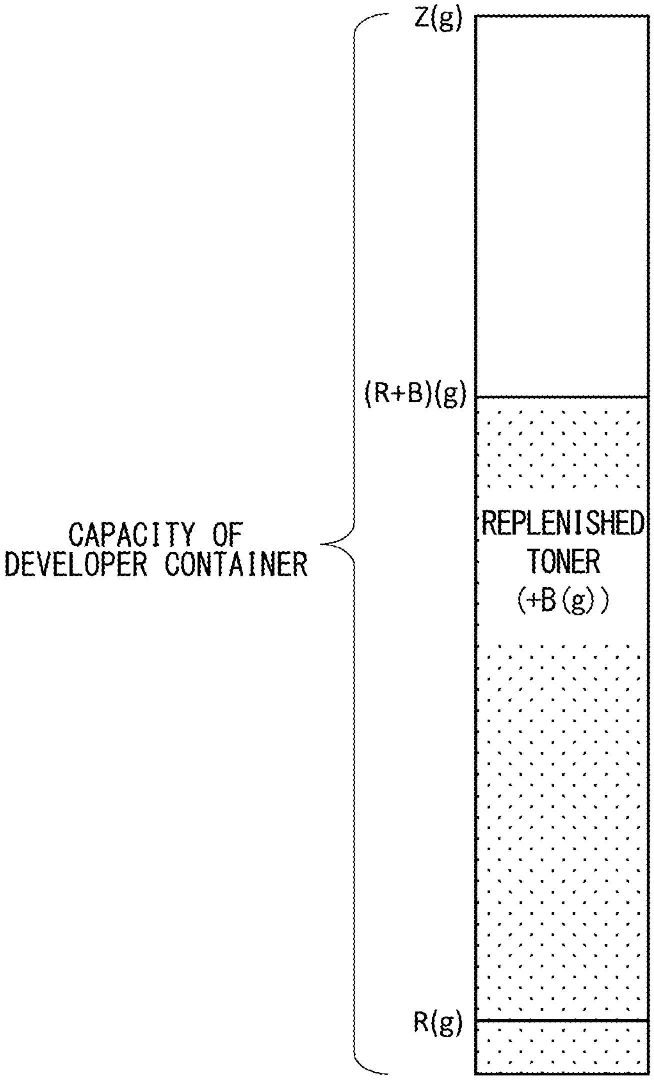
FIG. 18C is a graph illustrating a toner remainder amount when toner is replenished from a toner pack of a large capacity.

FIG. 18B is a graph indicating the toner amount in the case where the developer container 32 is replenished with toner by using the toner pack 40 filled with toner of A [g]. FIG. 18C is a graph indicating the toner amount in the case where the developer container 32 is replenished with toner by using the toner pack 40 filled with toner of B [g] (>A). To be noted, the product lineup of the toner pack 40 may include either one or both of a toner pack of a small capacity filled with toner of only A [g] and a toner pack of a large capacity filled with toner of B [g]. In addition, the product lineup of the toner pack 40 is not limited to 2, and 3 or more kinds may be prepared.

In the present embodiment, the amount of toner (A,B) charged into the toner pack 40 serving as a replenishment container satisfies the following formulae (1) and (2).

$$Y \leq A < Z - Y \quad (1)$$

$$Y \leq B < Z - Y \quad (2)$$

As illustrated in FIG. 18B, if the developer container 32 is replenished with toner of just A [g] by the toner pack 40 in the case where toner remaining in the developer container 32 is R [g] in the range of 0 [g] to X [g], the developer container 32 accommodates toner of (R+A) [g]. Since Y<(R+A) is satisfied according to the formula (1) described above, the toner remainder amount panel 400 after the toner replenishment indicates the Full level. That is, the threshold value Y [g] of the Full level is smaller than the replenishment amount A [g] supplied from the toner pack 40.

In addition, as illustrated in FIG. 18C, if the developer container 32 is replenished with toner of B [g] by the toner pack 40 in the case where toner remaining in the developer container 32 is R [g], the developer container 32 accommodates toner of (R+B) [g]. Since Y<(R+B) is satisfied according to the formula (2) described above, the toner remainder amount panel 400 after the toner replenishment indicates the Full level.

As described above, the capacity of the developer container 32 is set such that the toner remainder amount panel 400 always indicates the Full level in the case where toner replenishment is performed when the toner remainder amount panel 400 indicates the Mid level or the Low level. To be noted, the capacity of the developer container 32 does not have to be set such that the single toner pack 40 achieves the Full level, and for example, the Full level may be achieved by replenishment using a plurality of toner packs 40 each accommodating a small amount of toner.

In addition, the capacity of the developer container 32 is, according to the formulae (1) and (2) described above, set such that all toner charged into the toner pack 40 can move to the developer container 32 when the toner remainder amount panel 400 indicates the Mid level or the Low level. That is, the maximum amount Z [g] of the developer that can be accommodated in the developer container 32 is larger than a value obtained by adding the amount (A [g] or B [g]) of developer accommodated in the toner pack 40 to Y [g], which is the boundary between the Full level and the Mid level. In other words, the amount of toner charged into the toner pack 40 is smaller than the difference between the maximum amount of toner (Z [g]) that can be accommodated in the developer container 32 and the toner remainder amount (Y [g]) that is the boundary between the Mid level and the Full level.

As a result of this, the developer container 32 does not become full of toner while replenishing the developer container 32 with toner by using the toner pack 40, and leakage of toner from the replenishment port 32*a* during toner replenishment can be suppressed.

As described above, in the present embodiment, the second opening portion 82*a* is defined in the discharge tray 81 of the top cover 82, and the opening/closing member 83 openably and closably provided on the top cover 82. The opening/closing member 83 covers the second opening portion 82*a* in a closed state, and exposes the replenishment port 32*a* of the developer container 32 in an open state. Therefore, the user can access the replenishment port 32*a* by just opening the opening/closing member 83.

In the present embodiment, since the system (direct replenishment system) in which the developer container 32 is replenished with toner directly from the toner pack 40 through the replenishment port 32*a* is employed, the process cartridge 20 does not have to be taken out when replenishing the developer container 32 with toner. In addition, the replenishment port 32*a* of the developer container 32 is defined in the upper surface of the first projection portion 37 projecting upward from one end portion of the conveyance chamber 36 in the longitudinal direction, and is thus disposed in the vicinity of the second opening portion 82*a*. Therefore, the user can easily perform the toner replenishment operation on the developer container 32 through the replenishment port 32*a*. In addition, parts such as the developing roller 31 and the supply roller 33 are not replaced when replenishing the developer container 32 with toner, and thus the cost can be reduced.

In addition, since the laser passage space SP is formed to be surrounded by the first projection portion 37, the second projection portion 38, the grip portion 39, and the conveyance chamber 36, the developer container 32 and the scanner unit 11 can be disposed in the vicinity of each other, and thus the image forming apparatus 1 can be miniaturized.

Further, when attaching the toner pack 40 to the replenishment port 32*a* and performing the toner replenishment operation, since the agitation member 34 is driven, the packing phenomenon can be suppressed even if the replenishment port 32*a* is disposed on the one end side of the developer container 32 in the longitudinal direction. As a result of this, image defects can be reduced, and the detection precision of the toner remainder amount information can be improved.

In addition, the maximum amount Z [g] of the developer that can be accommodated by the developer container 32 is set to be larger than a value obtained by adding the amount (A [g] or B [g]) of developer accommodated by the toner pack 40 to Y [g], which is the boundary between the Full level and the Mid level. Therefore, the developer container 32 does not become full of toner while replenishing the developer container 32 with toner by using the toner pack 40, and leakage of toner from the replenishment port 32*a* during toner replenishment can be suppressed. By configuring the image forming apparatus 1 in this manner, a mode of an image forming apparatus that can satisfy the needs of the user can be provided.

To be noted, although the agitation member 34 is driven for a predetermined time (threshold value α) on the basis of operation of the button 1 of the operation portion 300 by the user in the toner replenishment process in the present embodiment, this is not limiting. For example, the driving of the agitation member 34 may be started by pushing the button 1 once, and the driving of the agitation member 34 may be stopped by pushing the button 1 again. Alternatively, the agitation member 34 may be driven only while the button 1 is pushed.

In addition, the display portion 301 may display a replenishment notification for prompting toner replenishment when the toner remainder amount of the developer container 32 reaches the Low level. In addition, a replenishment notification for prompting toner replenishment may be displayed on the display portion 301 when the toner is run out.

In addition, although the toner remainder amount of the developer container 32 is notified to the user by the toner remainder amount panel 400, the three-indicator configuration like the present embodiment does not have to be employed. For example, the toner remainder amount panel 400 may be constituted by one indicator, two indicators, four indicators, or more indicators. In addition, a configuration in which the toner remainder amount is continuously indicated by percentage presentation or gauge presentation. In addition, the notification of the toner remainder amount to the user may be performed by sound by using a loudspeaker.

First Modification Example

Figure 19A:
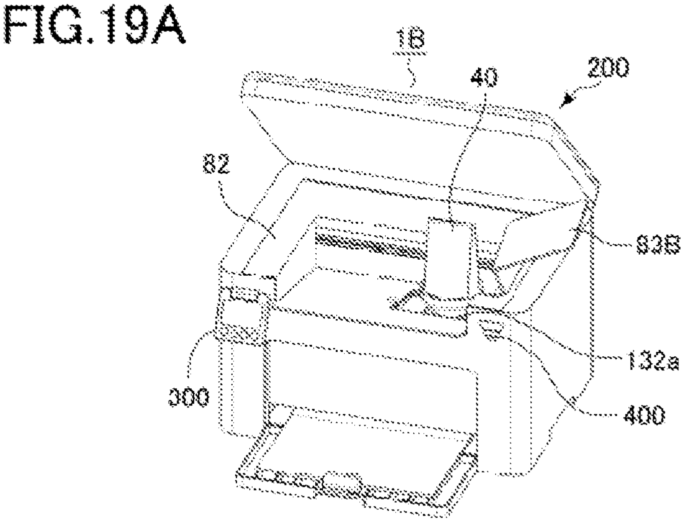
FIG. 19A is a perspective view of a first modification example of the image forming apparatus.

FIG. 19A illustrates a first modification example of the first embodiment. As illustrated in FIG. 19A, in an image forming apparatus 1B, a replenishment port 132*a* of a developer container is disposed on the right side of the apparatus, and an opening/closing member 83B is disposed on the right side of the apparatus. The opening/closing member 83B exposes the replenishment port 132*a* in an open state, and covers the replenishment port 132*a* in a closed state. By disposing the replenishment port 132*a* on the right side of the apparatus as described above, the replenishment port 132*a* is positioned in the vicinity of the toner remainder amount panel 400. Therefore, the toner remainder amount panel 400 can be easily checked when replenishing the developer container with toner using the toner pack 40.

Second Modification Example

Figure 19B:
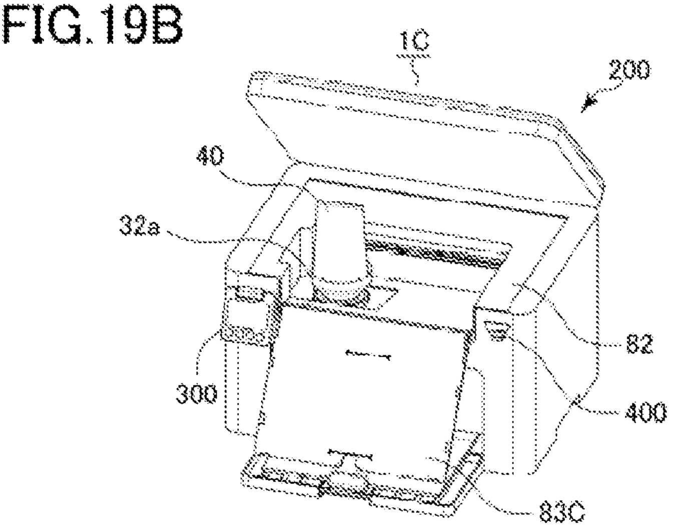
FIG. 19B is a perspective view of a second modification example of the image forming apparatus.

In addition, the configuration is not limited to the embodiment illustrated in FIG. 19A, and as illustrated in FIG. 19B, the present invention may be applied to an image forming apparatus 1C configured such that an opening/closing member 83C is opened to the front.

Third Modification Example

Figure 19C:
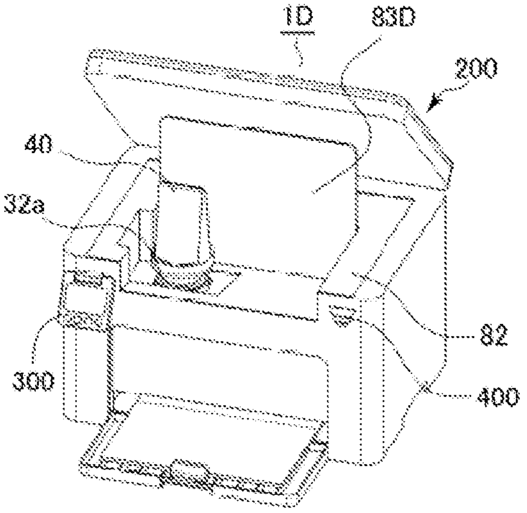
FIG. 19C is a perspective view of a third modification example of the image forming apparatus.

In addition, as illustrated in FIG. 19C, the present invention may be applied to an image forming apparatus 1D configured such that an opening/closing member 83D is opened to the rear side.

Fourth Modification Example

Figure 20A:
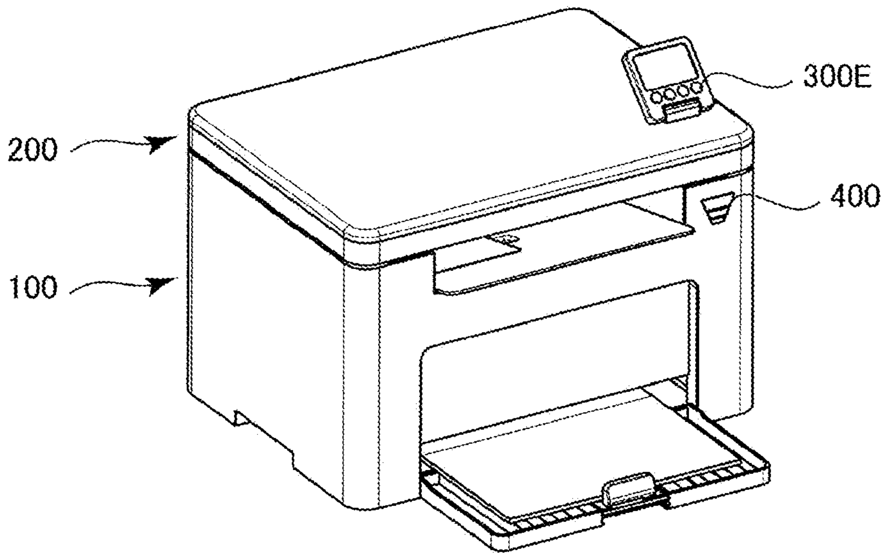
FIG. 20A is a perspective view of a fourth modification example of the image forming apparatus.

In addition, as illustrated in FIG. 20A, an operation portion 300E may be disposed in the reading apparatus 200 instead of in the printer body 100, or may be disposed on the right side of the apparatus together with the toner remainder amount panel 400. To be noted, as a matter of course, the operation portion 300E and the toner remainder amount panel 400 may be both disposed on the right side of the apparatus.

Fifth Modification Example

Figure 20B:
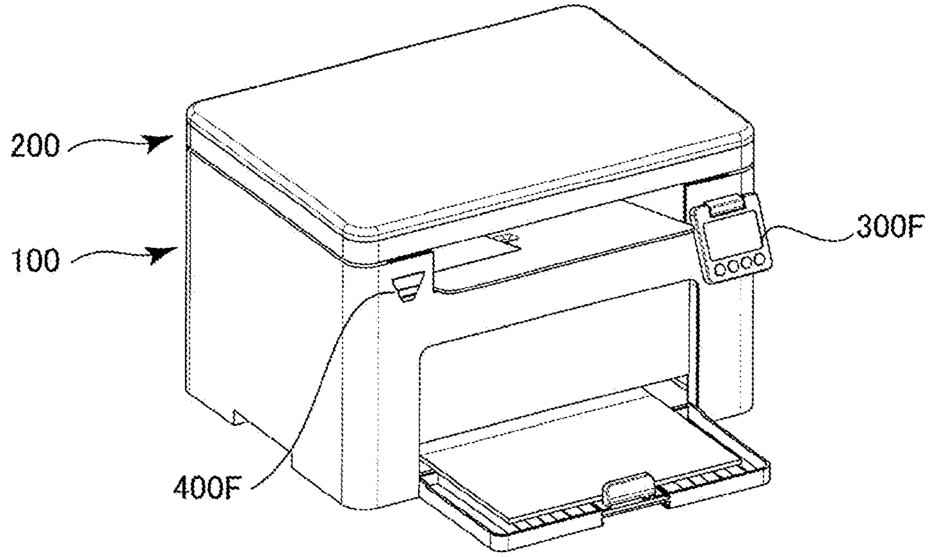
FIG. 20B is a perspective view of a fifth modification example of the image forming apparatus.

In addition, as illustrated in FIG. 20B, a toner remainder amount panel 400F may be disposed on the left side of the apparatus, and an operation portion 300F may be disposed on the right side of the apparatus.

Second Embodiment

Next, a second embodiment of the present invention will be described. In the second embodiment, the configuration of the replenishment port 32*a* is changed from the first embodiment. Therefore, elements substantially the same as in the first embodiment will be denoted by the same reference signs in the drawings, or the illustration thereof will be omitted.

Figure 21A:
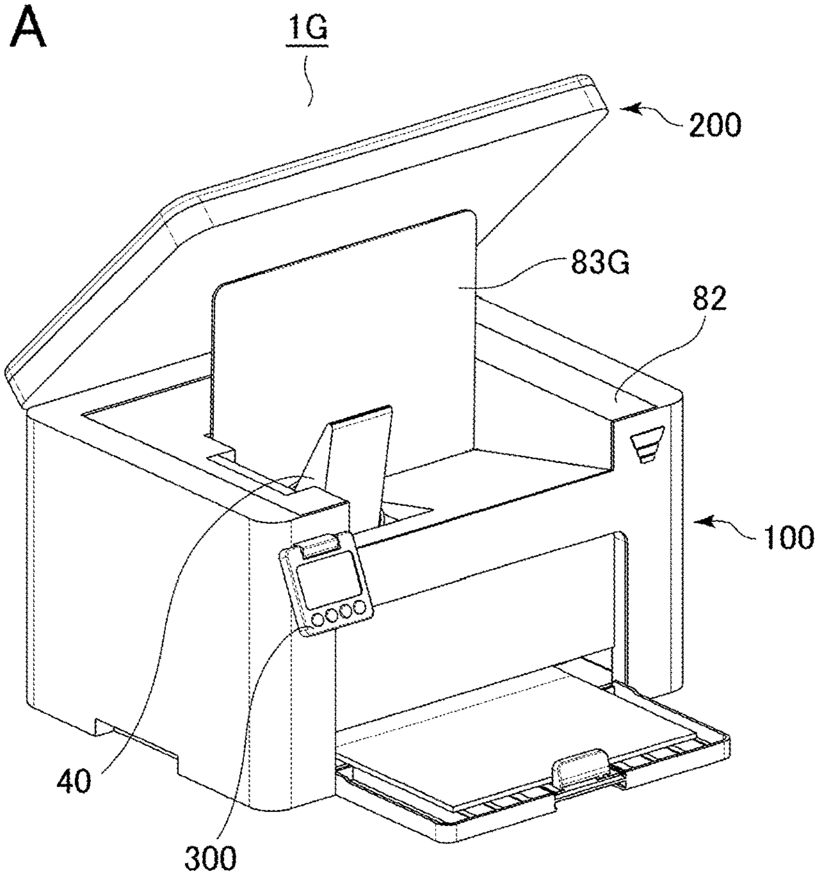
FIG. 21A is a perspective view of an image forming apparatus according to a second embodiment.

As illustrated in FIG. 21A, in an image forming apparatus 1G, an opening/closing member 83G is openably and closably supported by the top cover 82, and the opening/closing member 83G is configured to be opened to the rear side of the apparatus. By opening the opening/closing member 83G, a replenishment port 232*a* of a developer container 32G is exposed. Further, the replenishment port 232*a* opens downstream and upward in the discharge direction of the discharge roller pair 80 so as to be inclined with respect to the vertical direction. In other words, the replenishment port 232*a* opens obliquely toward the upper front side.

By configuring the replenishment port 232*a* in this manner, the toner pack 40 becomes inclined toward the front side in the state of being attached to the replenishment port 232*a*. Therefore, the space between the replenishment port 232*a* and the reading apparatus 200 can be utilized efficiently, and also a toner pack of a large capacity can be attached to the replenishment port 232*a*.

Figure 21B:
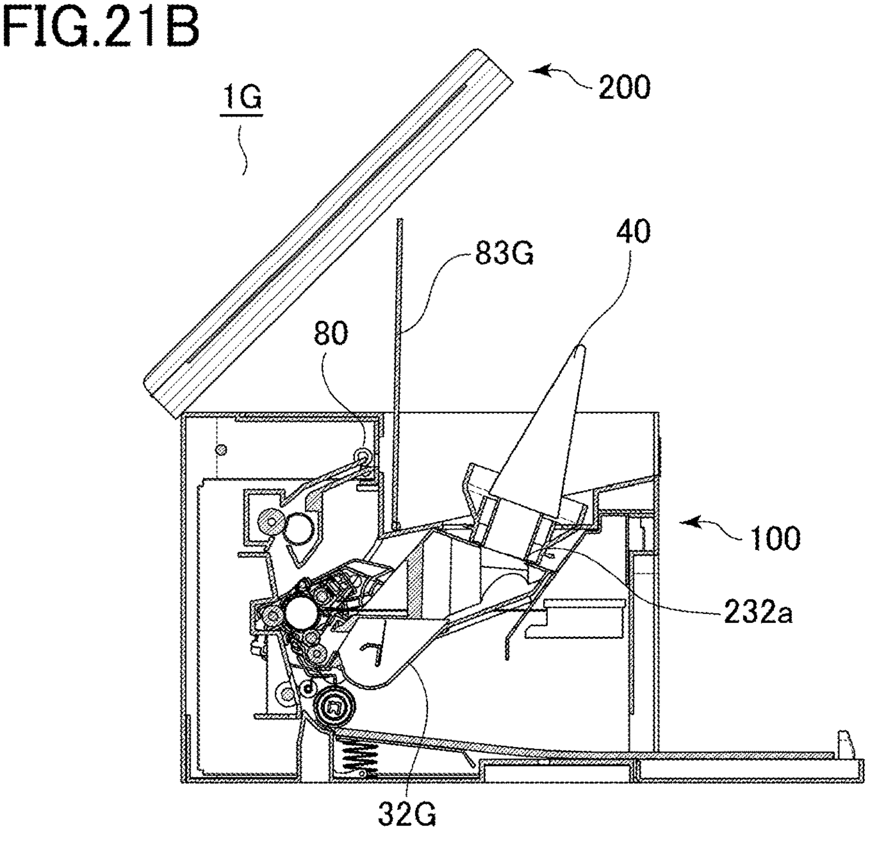
FIG. 21B is a section view of the image forming apparatus.
Figure 22A:
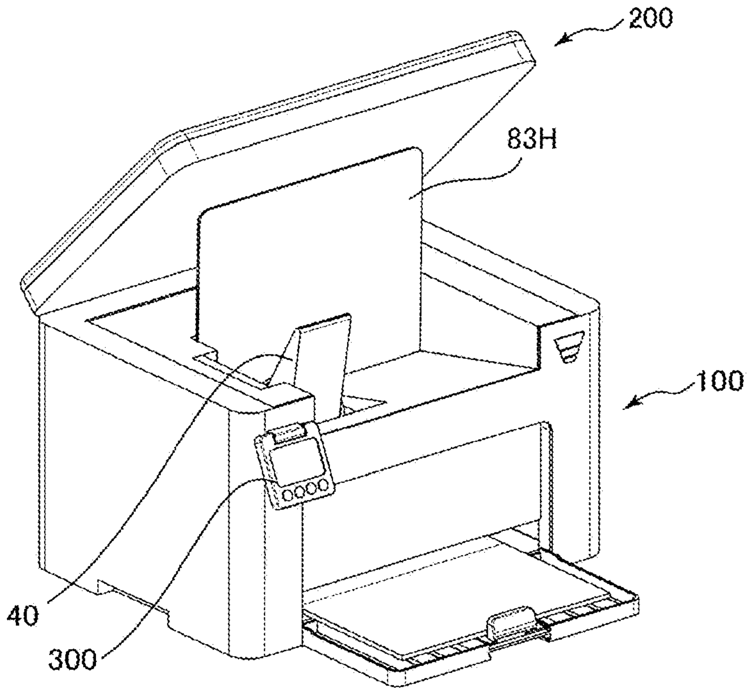
FIG. 22A is a perspective view of a modification example of the image forming apparatus according to the second embodiment.
Figure 22B:
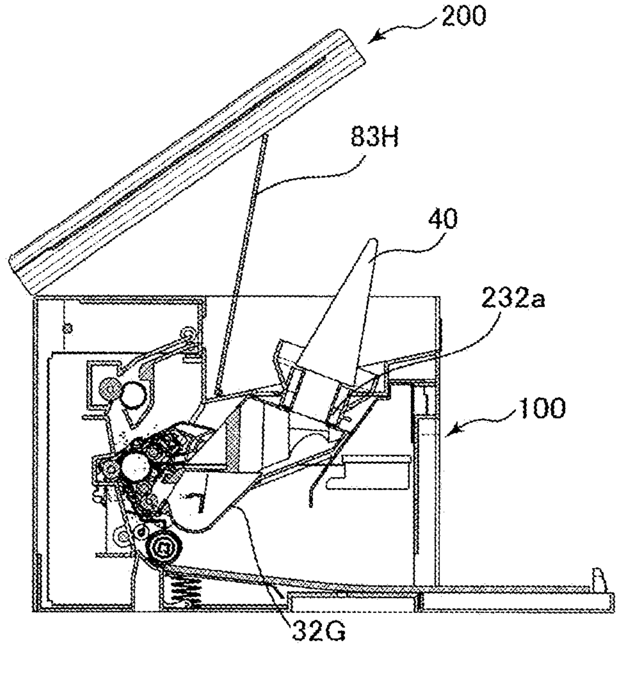
FIG. 22B is a section view of the modification example of the image forming apparatus according to the second embodiment.

To be noted, as illustrated in FIGS. 22A and 22B, an opening/closing member 83H and the reading apparatus 200 may be configured to be held at a less steep angle than in FIGS. 21A and 21B. By employing such a configuration, the installation space for the image forming apparatus 1 can be reduced.

Third Embodiment

Next, a third embodiment of the present invention will be described. In the third embodiment, the configuration of the cartridge guides 102 is changed from the first embodiment. Therefore, elements substantially the same as in the first embodiment will be denoted by the same reference signs in the drawings, or the illustration thereof will be omitted.

Figure 23A:
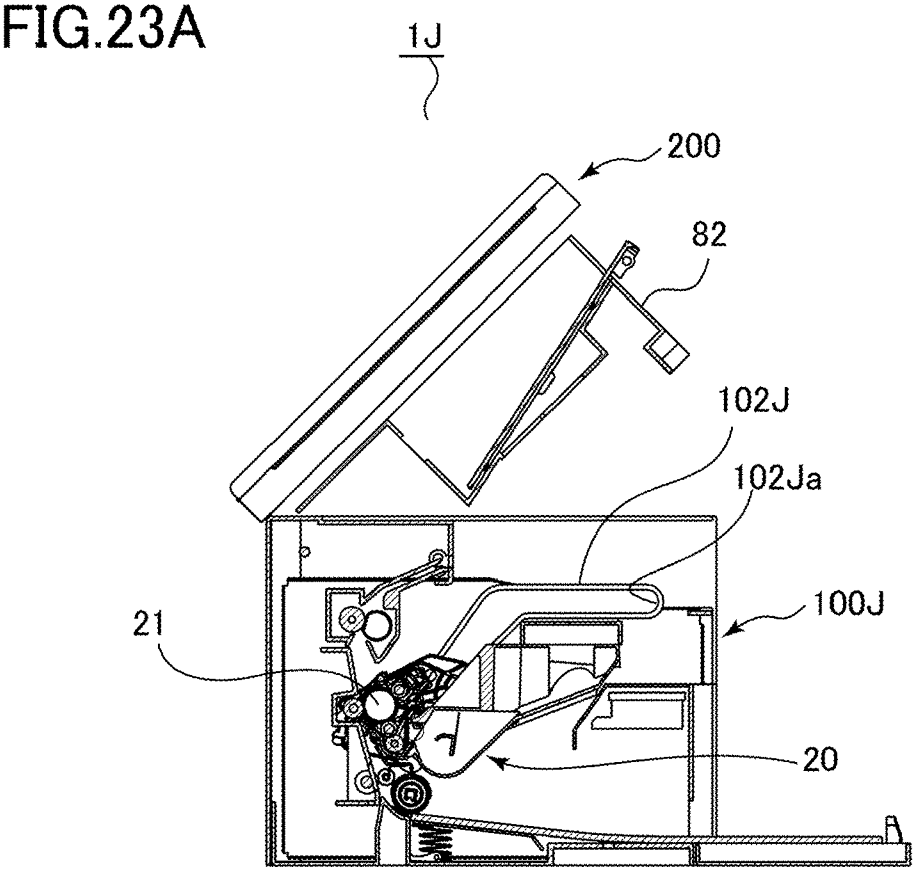
FIG. 23A is a section view of an image forming apparatus according to a third embodiment.
Figure 23B:
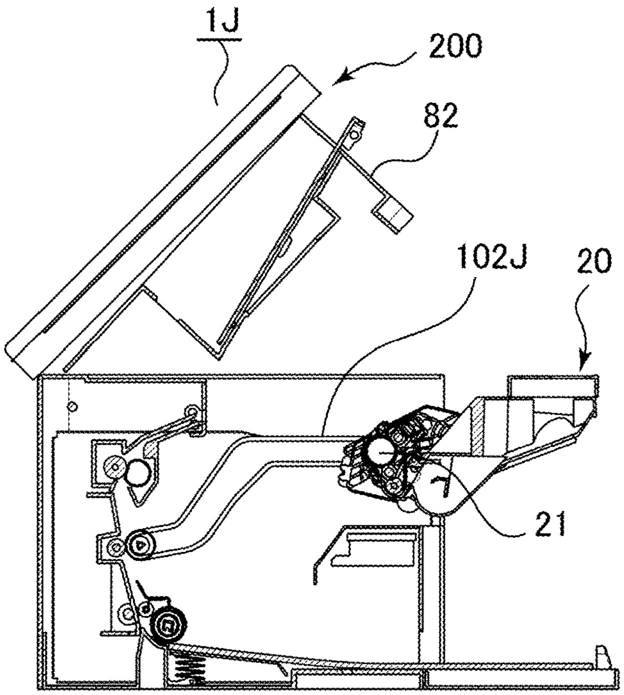
FIG. 23B is a section view of the image forming apparatus in a state in which a process cartridge is drawn out.

As illustrated in FIGS. 23A and 23B, an image forming apparatus 1J includes a printer body 100J and a reading apparatus 200, and the printer body 100J includes cartridge guides 102J. The cartridge guides 102J slide on projection portions 21*a* (see FIG. 5A) provided at end portions of the photosensitive drum 21 in the axial direction, and thus guide the process cartridge 20 when drawing out the process cartridge 20.

Draw-out stoppers 102Ja are formed at the downstream ends of the cartridge guides 102J in the draw-out direction. Therefore, when the user draws out the process cartridge 20 as illustrated in FIG. 23B, the projection portions 21*a* of the process cartridge 20 abut the draw-out stoppers 102Ja, and thus the process cartridge 20 is not detached from the printer body 100J. To be noted, unillustrated rotation stoppers are provided in the vicinity of the draw-out stoppers 102Ja, and the process cartridge 20 is held by the rotation stoppers so as not to rotate in the state of abutting the draw-out stoppers 102Ja.

Figure 24:
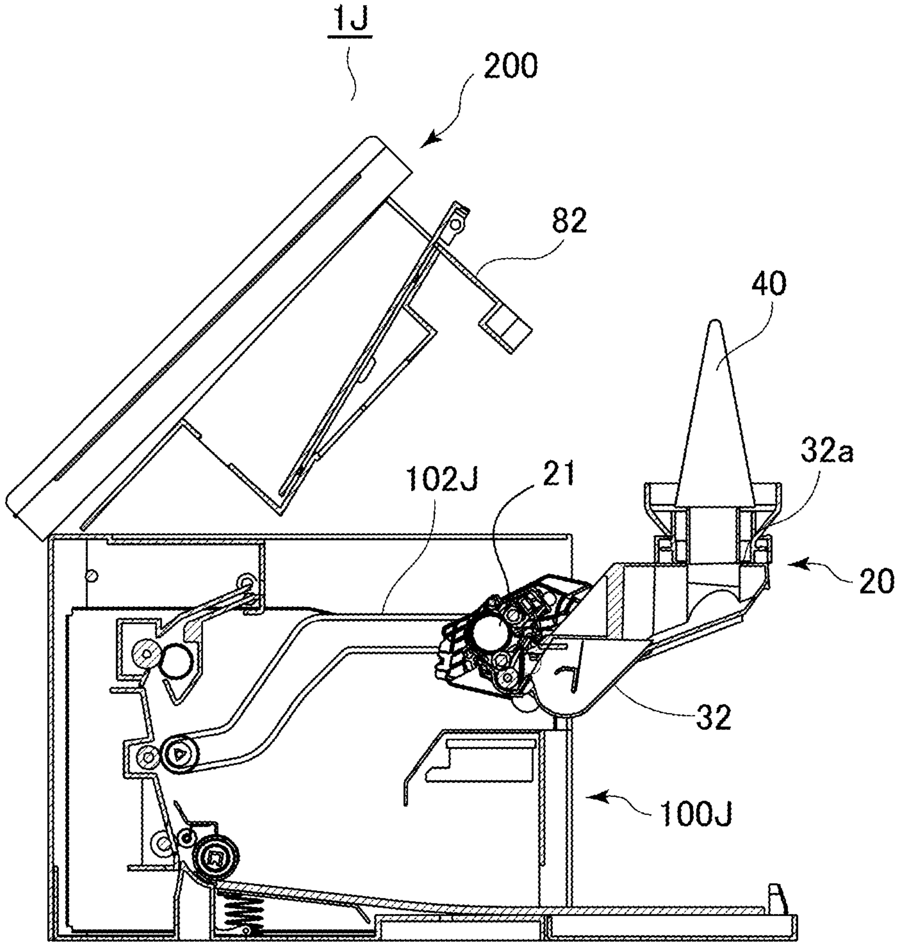
FIG. 24 is a section view illustrating a state in which a toner pack is attached to a process cartridge that has been drawn out.
Figure 25A:
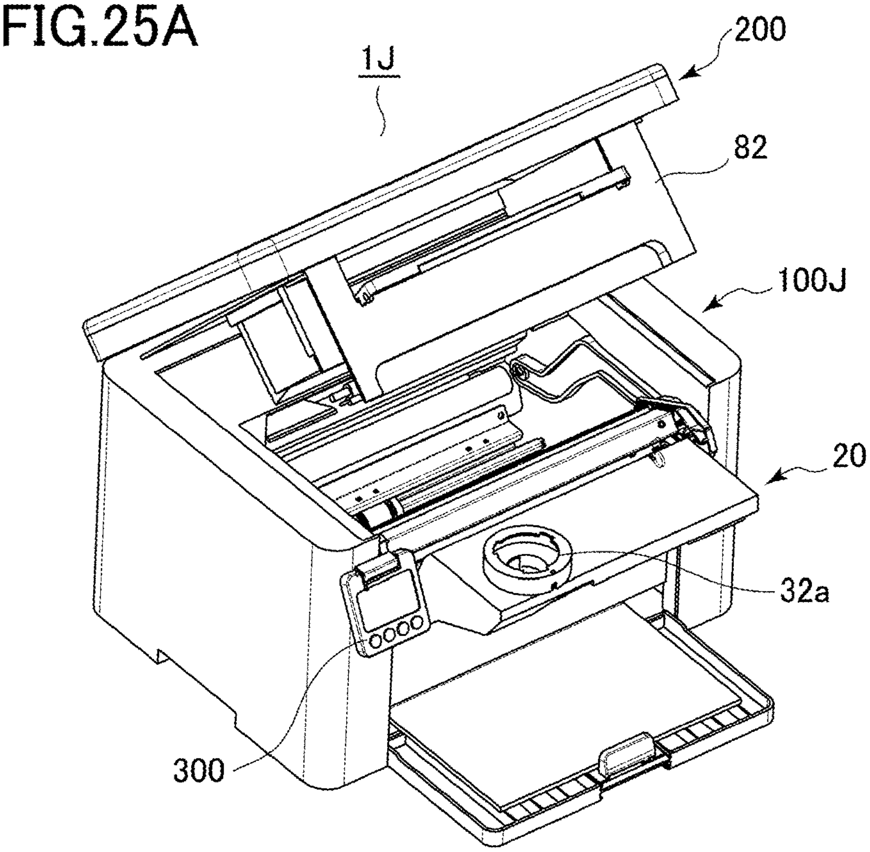
FIG. 25A is a perspective view of the image forming apparatus in a state in which the process cartridge is drawn out.
Figure 25B:
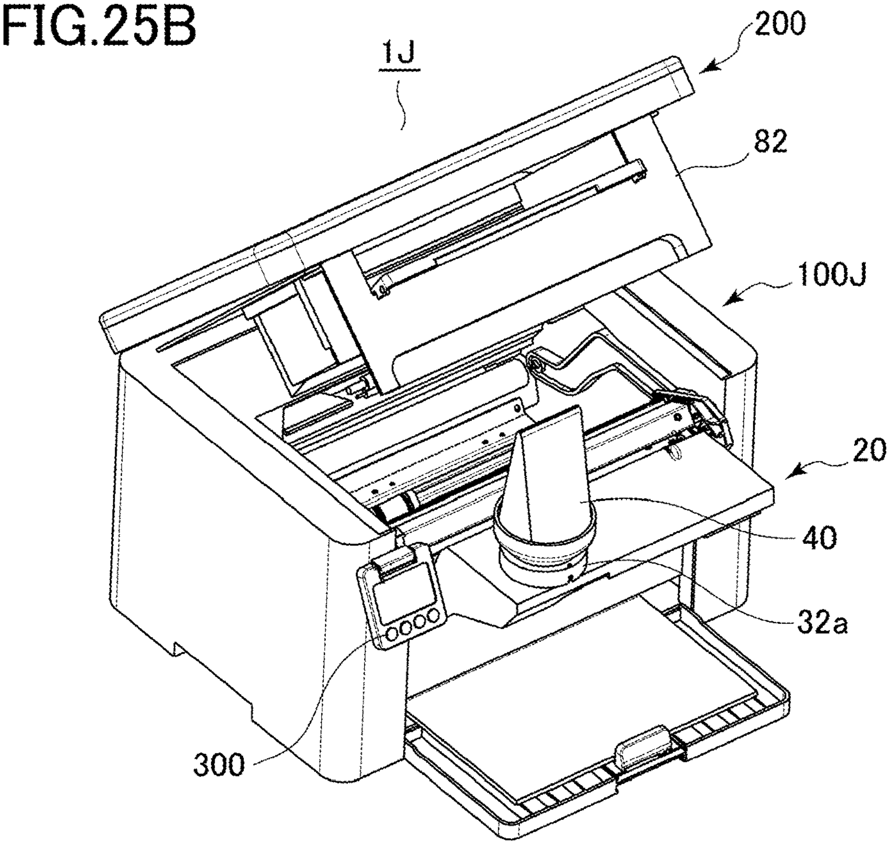
FIG. 25B is a perspective view illustrating a state in which a toner pack is attached to a process cartridge that has been drawn out.

As described above, in a state in which the process cartridge 20 is drawn out along the cartridge guides 102J, the replenishment port 32*a* is positioned on the front side of the image forming apparatus 1J as illustrated in FIGS. 24, 25A, and 25B. Therefore, the toner replenishment operation of replenishing the developer container 32 with toner through the replenishment port 32*a* by using the toner pack 40 can be easily performed. In addition, since a large space is provided right above the replenishment port 32*a*, a toner pack of a large capacity can be attached to the replenishment port 32*a*. To be noted, all the embodiments and modification examples described above may be combined appropriately.

To be noted, although the reading apparatus 200 is provided above the printer body in all the embodiments described above, this is not limiting. That is, the image forming apparatus may be a printer that does not include a reading apparatus. In addition, the reading apparatus may be a reading apparatus that includes an auto document feeder (ADF) that feeds a document.

Other Embodiment

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus to and from which a replenishment container accommodating developer is attachable and detachable, the image forming apparatus comprising:

an opening/closing member; and a process unit including:

- an image bearing member configured to rotate while bearing a developer image;
- a developer bearing member configured to bear developer and supply the developer to the image bearing member; and
- a developer container configured to rotatably support the developer bearing member and including an accommodating portion configured to accommodate the developer to be borne on the developer bearing member, wherein the process unit includes a projection portion provided at one end portion thereof in a rotation axis direction of the image bearing member, the projection portion projecting upward more than a center portion of the process unit in the rotation axis direction, wherein the projection portion includes an attachment portion to and from which the replenishment container is attachable and detachable, the attachment portion being provided with a replenishment port through which the accommodating portion is replenished with the developer from the replenishment container, wherein the opening/closing member is movable between a closed position where the opening/closing member is closed to cover the attachment portion and an open position where the opening/closing member is opened to expose the attachment portion and where an attachment of the replenishment container to the attachment portion is allowed, the opening/closing member being prevented from being moved from the open position to the closed position by the replenishment container in a state that the replenishment container from which the accommodating portion has been replenished with the developer is attached to the developer container.

2. The image forming apparatus according to claim 1, further comprising an exposing portion configured to expose the image bearing member to form an electrostatic latent image on the image bearing member, wherein light emitted from the exposing portion toward the image bearing member passes through a space adjacent to the projection portion in the rotation axis direction.

3. The image forming apparatus according to claim 1, further comprising:

a supporting portion configured to support a recording material onto which the developer image is formed and which is discharged to an outside of the image forming apparatus; and a discharge portion configured to discharge the recording material onto which the developer image is formed toward the supporting portion in a discharge direction, wherein the projection portion projects toward the supporting portion.

4. The image forming apparatus according to claim 3, wherein the projection portion projects downstream and upward from the accommodating portion in the discharge direction.

5. The image forming apparatus according to claim 1, wherein the projection portion is closer to a center, in the rotation axis direction, of the image bearing member than an end, in the rotation axis direction, of the image bearing member.

6. The image forming apparatus according to claim 1, wherein the opening/closing member is configured to rotate between the open position and the closed position.

7. The image forming apparatus according to claim 1, wherein the process unit is attached to and detached from an apparatus main body including the opening/closing member.

8. The image forming apparatus according to claim 1, wherein the developer container includes the projection portion, and wherein the projection portion projects upward more than a center portion, in the rotation axis direction, of the developer container.

9. The image forming apparatus according to claim 8, further comprising a conveyance member that is a rotary member closest to the replenishment port, wherein the conveyance member is configured to rotate to convey the developer in the accommodating portion toward the developer bearing member.

10. The image forming apparatus according to claim 8, further comprising a conveyance member including a support portion and a flexible sheet fixed to the support portion, the conveyance member being rotatably supported by the developer container, wherein the conveyance member is configured to rotate to convey the developer accommodated in the accommodating portion to the developer bearing member.

11. The image forming apparatus according to claim 8, wherein the accommodating portion is integrally formed with a frame member that supports the image developer bearing member, and wherein the image forming apparatus further includes a conveyance member provided in the accommodating portion and configured to convey the developer accommodated in the accommodating portion toward the developer bearing member.

12. The image forming apparatus according to claim 1, wherein the attachment portion is the only attachment portion provided in the developer container.

* * * * *